Nov. 14, 1950 P. SCHWERIN 2,529,519
AUDIENCE-REACTION ANALYZING SYSTEM
Filed Sept. 28, 1948 7 Sheets-Sheet 1

INVENTOR.
P. SCHWERIN
BY M. S. Pineles
ATTORNEY

Nov. 14, 1950 P. SCHWERIN 2,529,519
AUDIENCE-REACTION ANALYZING SYSTEM
Filed Sept. 28, 1948 7 Sheets-Sheet 2
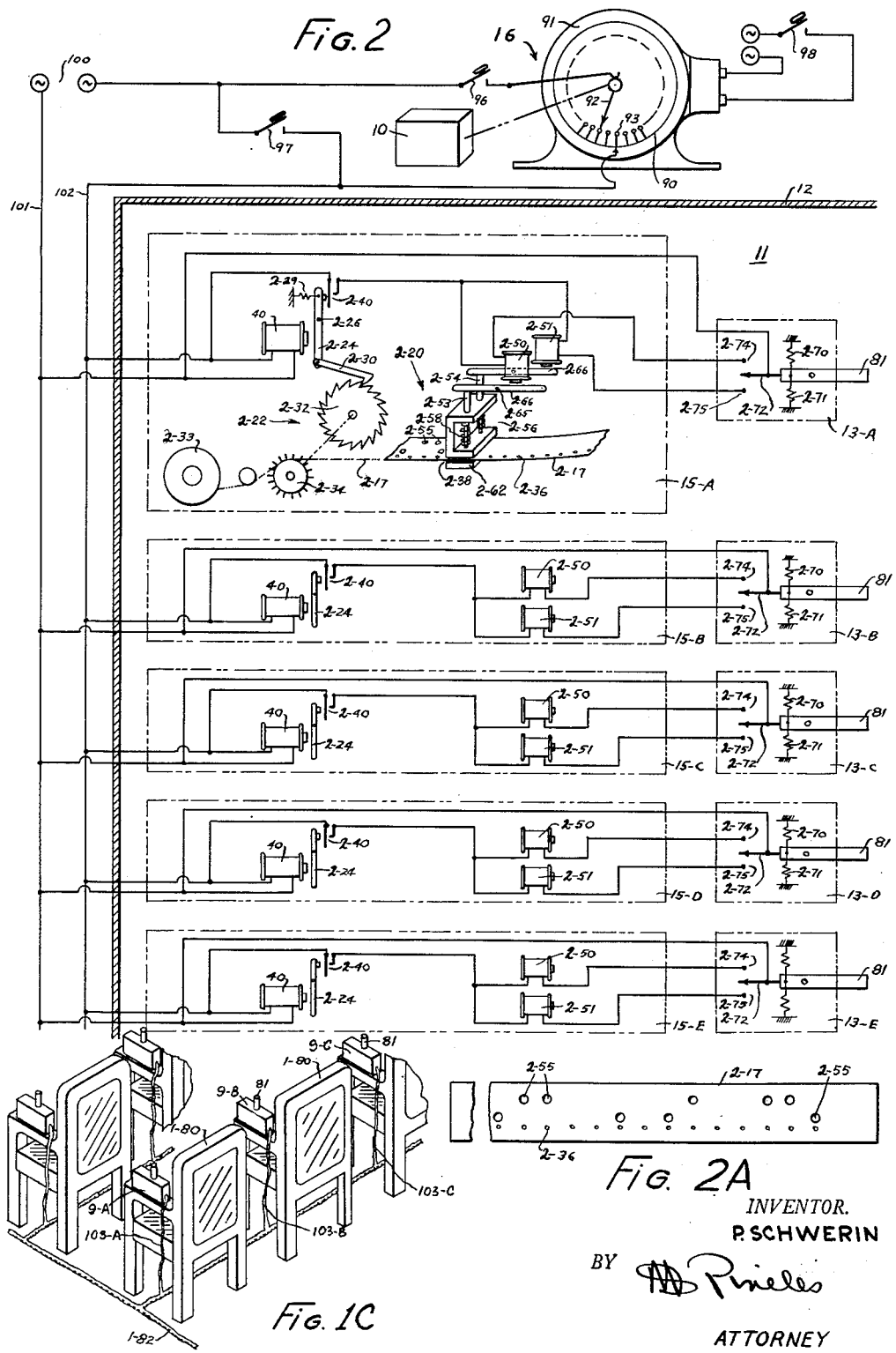
INVENTOR.
P. SCHWERIN
BY
ATTORNEY

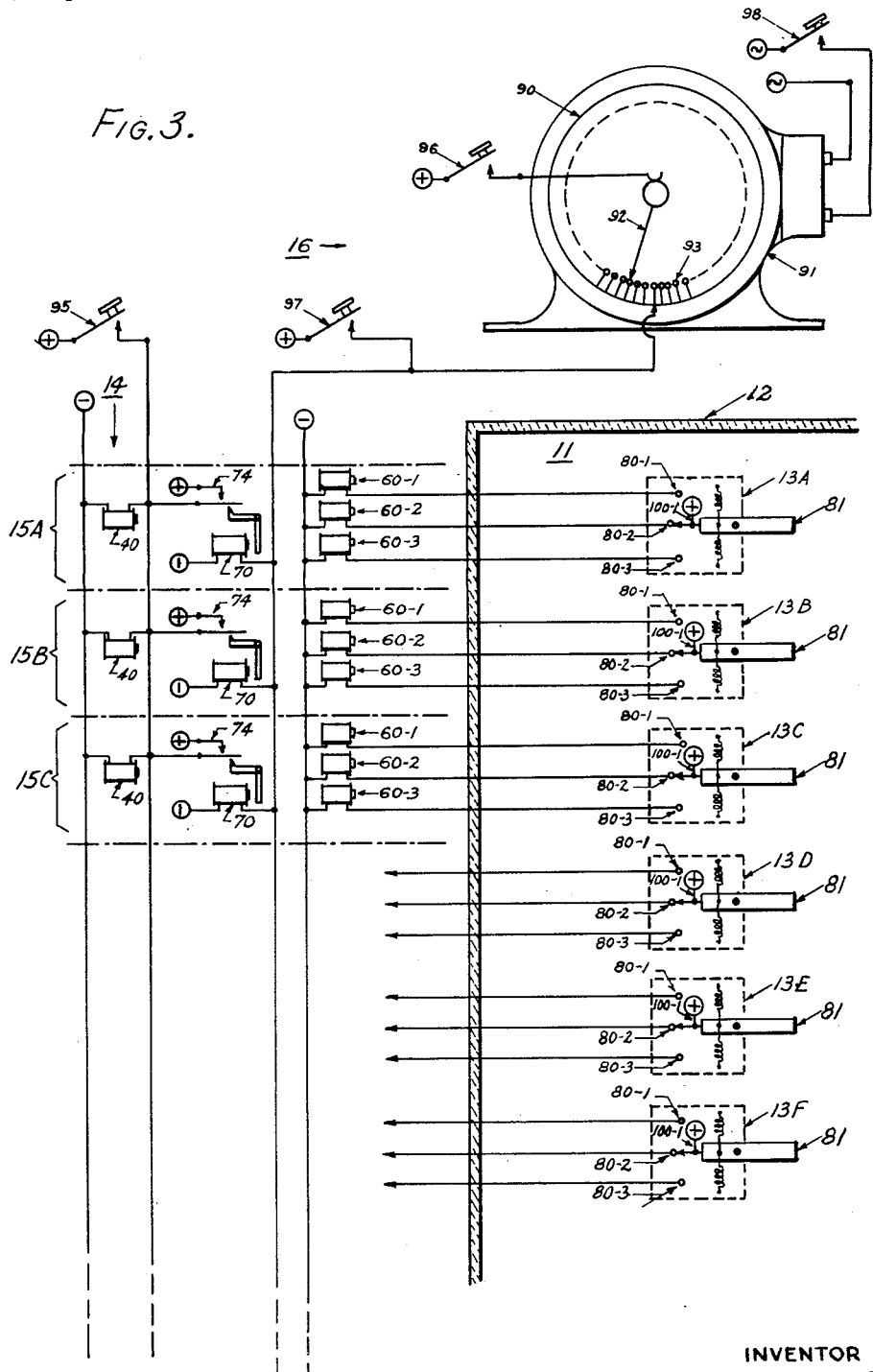

Nov. 14, 1950 P. SCHWERIN 2,529,519
AUDIENCE-REACTION ANALYZING SYSTEM
Filed Sept. 28, 1948 7 Sheets-Sheet 4
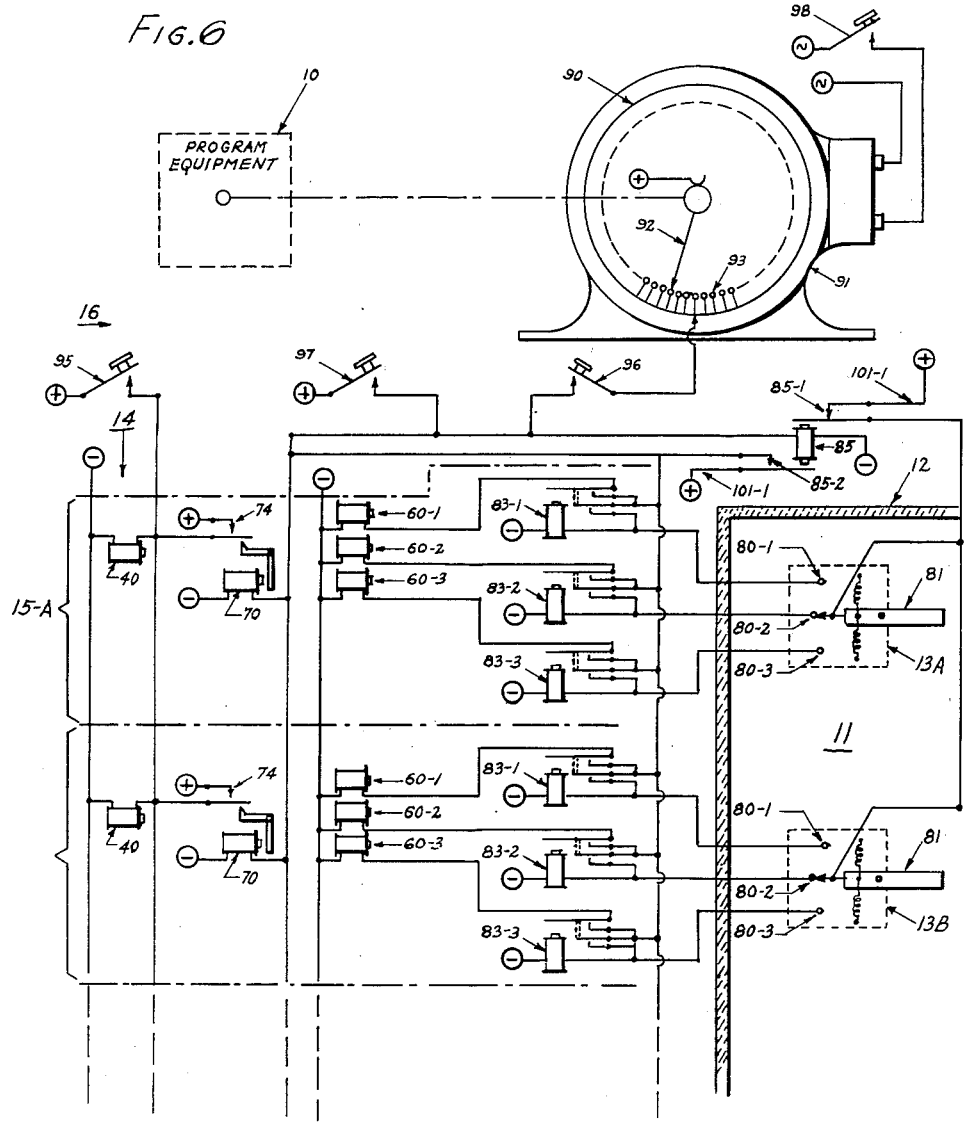
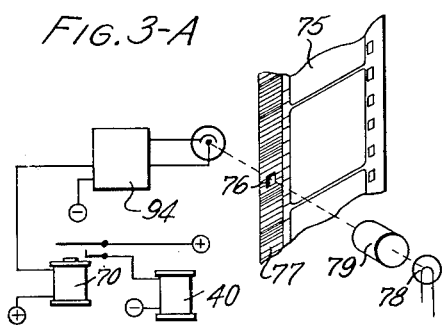
INVENTOR
PAUL SCHWERIN
BY
ATTORNEY Nov. 14, 1950 P. SCHWERIN 2,529,519
AUDIENCE-REACTION ANALYZING SYSTEM
Filed Sept. 28, 1948 7 Sheets-Sheet 7
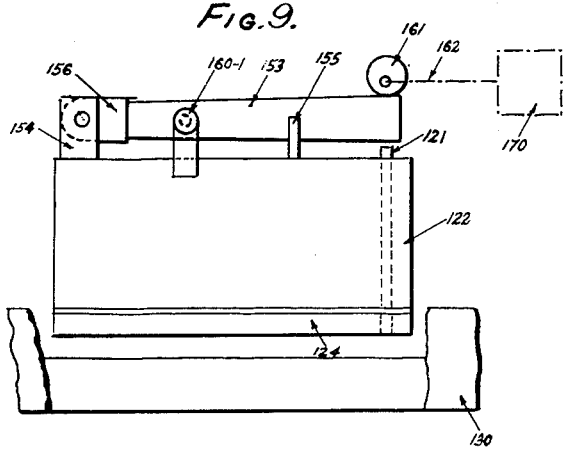
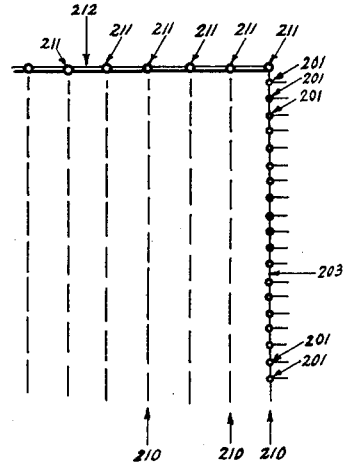
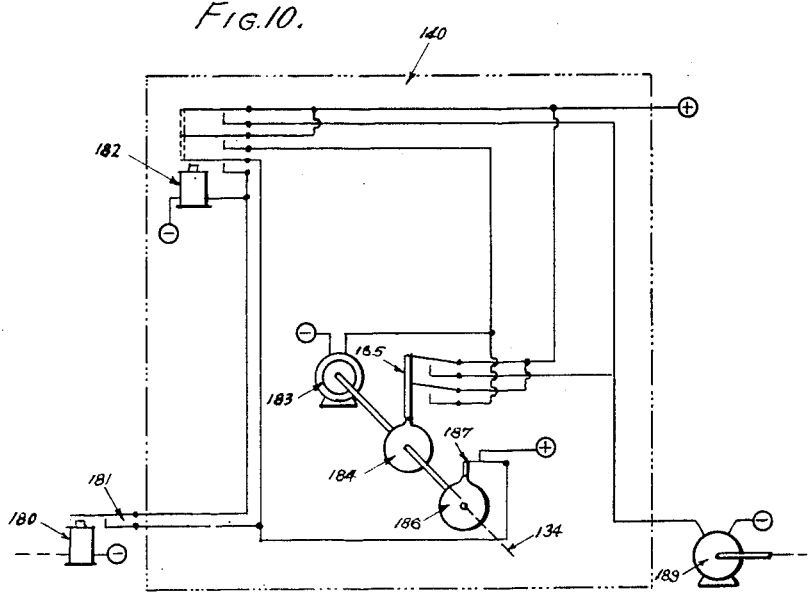
INVENTOR
PAUL SCHWERIN
BY
ATTORNEY

Patented Nov. 14, 1950

2,529,519

UNITED STATES PATENT OFFICE 2,529,519

AUDIENCE-REACTION ANALYZING SYSTEM

Paul Schwerin, White Plains, N. Y., assignor to Schwerin Research Corp., New York, N. Y., a corporation of New York Application September 28, 1948, Serial No. 51,630

14 Claims. (Cl. 346—33)

This application is a continuation-in-part of the application, Serial No. 663,424, filed April 19, 1946, now abandoned.

This invention relates to audience-reaction analyzing systems for evaluating the reactions of an audience of a plurality of observers to a performance such as a radio or television broadcast or moving picture performances.

Among the objects of the invention is novel audience-reaction analyzing systems utilizing marking mechanisms arranged to operate in predetermined relation with the progress of a performance for preparing punched records on an array of statistical cards corresponding to the reactions of the individual observers attending the performance in such manner as to make it possible to utilize the cards in standard statistical card analyzing equipment for evaluating the effectiveness of the performance and its appeal to the various types of observers in the audience.

The foregoing and other objects of the invention will be best understood from the following description of specific exemplifications thereof, reference being had to the accompanying drawings wherein:

Fig. 1C is a broken perspective view of the details of a wiring interconnection and mounting arrangement for the apparatus of Fig. 1;

Fig. 2 is a view similar to Figs. 1 and 1A of a modified form of audience-reaction analyzing system according to the invention;

Fig. 2A is a broken view of a punched record tape as prepared with the apparatus of Fig. 2;

Fig. 3 is a view similar to Figs. 1 and 2, of a further form of audience-reaction analyzing system of the invention;

Fig. 3A is an alternative control arrangement for the analyzing system of the invention;

Fig. 6 is a diagrammatic view and circuit diagram of an audience-reaction analyzing system exemplifying the invention;

Fig. 9 is a side view of a portion of the machine shown in Figs. 7 and 8;

Fig. 10 is a circuit diagram illustrating one form of a cyclically operating drive unit for imparting a control motion to elements of a recording machine, such as shown in Figs. 7 to 9; and Fig. 11 is a diagram of a modified system of wiring interconnection between the signal units and the recording units.

Figures 1, 1A, 1B:
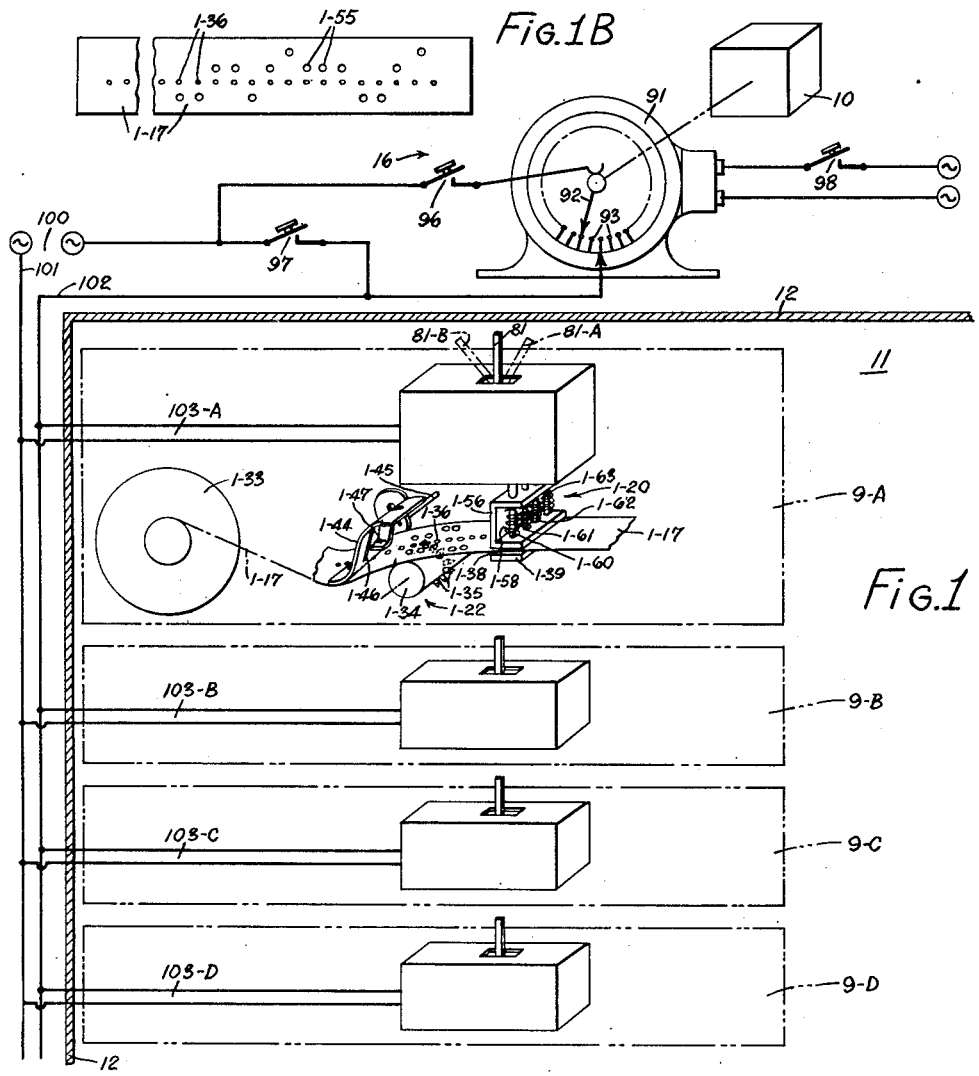
Fig. 1 is a diagrammatic view and circuit diagram of the general arrangement of one form of audience-reaction analyzing system based on the principles of the invention.
Fig. 1A shows in simplified form the details of a record marking mechanism suitable for use with the system of Fig. 1.
Fig. 1B is a broken plan view of a marked record tape such as is prepared by the construction of Fig. 1.

Figure 1 indicates at 11 an auditorium bounded by walls 12 in which a performance to be analyzed is held. A plurality of seats may be arranged for the observers, each seat being provided with a recording unit schematically indicated at 9—A, 9—B, 9—C and 9—D. A control unit 16 which may be outside the auditorium 11 is arranged for supplying energizing power from a main power supply 100 shown by a pair of circled sine wave symbols, for operation of the apparatus.

Some of the details of a recording unit of this form of the invention are shown in the first recorder unit 9—A. The other units may be of similar construction. In this construction a pair of energizing bus leads 101, 102 are connected to each of the recording units by means of branches 103—A, 103—B, 103—C. One of the lead busses 101 is shown as directly connected to one terminal of the energy source, the other bus 102 being connected to the other terminal through the control unit 16. Included in the control unit 16 is a timer 91, timer connecting switch 96, and manual operating switch 97. The timer 91 may be driven by an electric motor controlled through an additional timer operating switch 98 arranged for energizing the motor from a convenient power source as indicated. The apparatus of the invention may also include a performance record means shown at 10 for presenting a reproduction, as from a phonograph or moving picture record, of the program to be analyzed, or for recording a live program being presented.

The control unit 16 is arranged to provide power impulses momentarily energizing the recording units at predetermined portions of the performance being analyzed. The timer 91 may be arranged to intermittently close the energizing circuit in synchronism with the performance as, for example, by moving a wiping contact arm 92 over a set of adjustable fixed contacts 93. A brush contact for the movable arm 92, and a connector ring 90 to which the fixed contacts 93 are connected, are inserted in the power supply circuit through switch 96 for providing an energizing pulse each time the wiper arm 92 engages one of the contacts 93. The wiper arm 92 may be rotated as by an induction type electrical motor held in the housing of timer 91 and powered as by the conventional 60-cycle alternating power supplied under the control of switch 98. An additional manual operator 97 may be provided for making an extra recording when desired and by-passing the timer 91.

As diagrammatically indicated in Fig. 1, the timer unit is also interconnected with the performance record structure 10. The details of the synchronizing interconnection between the program equipment 10 and the synchronized control unit will depend on the character of the program equipment. Since all of such program equipments are provided with a drive motor for driving the recording medium on which the performance is recorded or from which the program is reproduced, it is a relatively simple matter to provide a mechanically or electrically synchronized driving interconnection between the mechanism of the program equipment and the moving elements, such as the rotary contactor 92 of the synchronized control unit, it being understood that any electrical angular motion transmitting system, such as a Selsyn transmission system, may be used for synchronizing the operation of the control unit with the movement of one of the elements of the program equipment 10.

Each recording unit 9—A to 9—B is arranged for providing a record of the response of an observer to the performance being analyzed. The type of unit shown at 9—A includes a record sheet in the form of a tape 1—17, a record marking arrangement in the form of a punch assembly 1—20, and a tape advancing mechanism 1—22 so disposed that the tape may be advanced in steps and the marking arrangement applied to the paper at each step for an indication of the nature of the observer's approval to the portion of the program concurrently presented. A signal lever 81 projecting from the approval recording unit is arranged for convenient operation by an observer to represent the various grades of approval. Thus, for example, the lever 81 may be biased towards a central position shown in full lines in which it will cause the marking of the tape in a manner indicating a neutral reaction by the observer, but may be shifted in either direction to opposite positions shown by the dash lines 81—A, 81—B, in which it causes the tape to be marked to indicate greater approval and lesser approval, respectively.

The marking arrangement 1—20 is shown as including a set of punches 1—60, 1—61, 1—62, and 1—63, held in an upwardly biased position as by the springs 1—58 in a guide block 1—56. A matrix backing 1—39 is spaced from the punch-holding guide block 1—56 to provide a passageway 1—38 through which the tape is fed and selectively marked by the controllable downward actuation of the various punches. The tape is advanced by a rotatable feed sprocket 1—34 having outwardly projecting teeth 1—35 which engage feed perforations 1—36 suitably placed along a feed track portion of the tape 1—17. The tape is held in contact with the feed sprocket by a retractable retainer 1—44 pivotally mounted on a shaft 1—45. The retainer 1—44 is curved to generally correspond to the curvature of the feed sprocket 1—34 and is shown in the retracted position in which it is held while the tape is threaded in place. After proper mounting of the tape the curved retainer 1—44 is brought into holding engagement with the tape on the sprocket and prevents disengagement of the sprocket teeth 1—35 from the feed openings 1—36. A slot 1—46 in the retainer is arranged to receive the upstanding sprocket teeth 1—35 and assure that the adjacent portions of the retainer properly guide the tape over them. An over-center bias may conveniently be arranged for automatically holding the retainer in either the retracted or tape feed positions between which it can be moved by manual operation of an outwardly extending ear 1—47. As the tape is fed it is collected on a spool 1—33 actuated in any conventional manner, as by the use of a slipping drive belt linkage. A similar spool, not shown, may be provided for storing the tape in the approval recording unit and for supplying it as it is taken up by the advancing feed mechanism.

The specific details of the marking mechanism form no part of the present invention, and the form illustrated is merely shown for convenience. Any other practical tape marking arrangements may be used in place of that shown. Thus, for example, a tape punching and advancing feed unit may be in the form supplied by the International Business Machines Corporation on their Type 057 Card Controlled Tape Punch and identified as Tape Punching Unit Type 960. This unit is described and illustrated in the publication of this corporation entitled "Application and Operation of Types 040 and 057 Machines," copyrighted 1943.

Fig. 1A shows an example of the details of an actuating mechanism for marking the tape. These details are only diagrammatic, and any practical mechanism such as the one embodied in the above commercial tape-punching unit is suitable.

Referring more particularly to Fig. 1A, there is shown a set of punching solenoids 1—50, 1—51, 1—52 and 1—53 arranged to actuate the punches 1—60 to 1—63 through individual punch levers 1—90, 1—91, 1—92 and 1—93 pivoted on a common axis 1—68. The punches shown in their retracted biased position are accordingly selectively actuated through a marking cycle upon the energization of the selected punching solenoids. One of the punches, such as punch 1—61, may be arranged to leave a distinctive mark to indicate the individual advancing steps or program approval points. As shown, punch 1—61 is thinner than the rest and leaves a succession of small perforations which not only indicate the feed steps but also act as feed sprocket holes by which the tape is advanced. The other punches 1—60, 1—62 and 1—63 may all be arranged to impart similar markings differing only in position transversely of the tape.

The record sheet advancing mechanism operates advancing steps adjusted to be completely out of phase with the punching steps to assure that all the punches are in retracted position when the advancing is effected. Thus, the advancing step is not started until after the punching operation is completed or the punching is not started until the advancing step is completed. In the diagrammatic showing of Fig. 1A, the record sheet advancing mechanism includes a feed ratchet 1—32 held on a shaft carrying feed sprocket 1—34 and engaged by a biased advancing pawl 1—30 arranged to be actuated by an advancing solenoid at the completion of a marking operation.

An interlock bar 1—67 placed across the punch levers 1—90 to 1—93 is connected to momentarily close an advancing switch 1—40 for energizing the advancing mechanism through an advancing step upon the return of all the punches to their retracted position. The interlock bar 1—67 is shown as biased into engagement with the punch levers and pivotally connected as through a bent-over extension 1—66 with a trip pawl 1—79 for stepwise rotation of a ratchet wheel 1—78. The advancing switch is arranged so that at about the end of every rotatory step of the ratchet 1—78 when the punches are all retracted from the tape, the switch is momentarily closed to initiate a tape-advancing step. An additional cam 1—77 may be mounted for rotation with the ratchet wheel 1—78 and closing the contacts of switch 1—40, as shown, or the ratchet teeth of wheel 1—78 may themselves form such suitable switch closing cams.

The record energizing leads 103—A are directly connected with the advancing mechanism as well as the feed punch solenoid 1—51. At the same time energy is supplied to one of the other punch solenoids through a selector switch blade 1—72 moved by the manually operable selector arm 81 into circuit-closing contact with a series of fixed contacts 1—73, 1—74, 1—75.

With the above arrangement, at each predetermined point of the program presentation when an approval record is to be made, the record units 9—A, 9—B, 9—C, 9—D, etc. are energized. At the same time the individual observers, by suitably positioning the selector handles 81, indicate the nature of their approval. The record energization pulse accordingly actuates the step-indicating and feed punch 1—61 together with one of the other punches, depending upon the position of the individual recording levers 81. During the energization pulse the tilted condition of one or more of the punch levers 1—90, 1—91, 1—92 and 1—93 raises the interlock bar 1—67, bringing the trip pawl 1—79 into engagement with a switching tooth of ratchet 1—78. At the completion of the recording pulse, the punches are all returned by their bias to the inoperative positions in which they are shown, permitting the retraction of the interlock bar by its bias, thereby causing the pawl to rotate the switching ratchet in counterclockwise direction in the form shown. The advancing switch 1—40 is closed by a cooperating tooth of the adjacent gear near the end of its rotating step when the marking punches have been drawn out of contact with the tape sheet 1—17. This actuates the advancing pawl and causes rotation of the feed sprocket 1—34 through an advancing step bringing the record tape sheet forward and placing its next marking zone under the set of marking punches, ready for the next marking cycle. In the form shown, the advancing switch is so arranged that it is opened at the completion of each trip step of switching pawl 1—79 so that advancing cannot take place until after a marking cycle. If desired, the apparatus may include an arrangement for prevention of multiple recording at each marking step, as for example, when the observer changes his mind.

One such arrangement is shown in Fig. 1A as a locking relay unit 1—96 inserted in the approval marker selecting circuits. A separate relay in each approval circuit is connected so that the relay in the circuit closed by the position of movable indicator 81 automatically locks itself into energized position when the recording pulse is transmitted through lines 101, 102. At the same time the energized relay opens the current supply circuit to the movable indicator 81 and prevents energization of the other relays during the continuance of the pulse. The approval punch solenoids 1—50, 1—52 and 1—53 are each shown as connected in parallel with a corresponding locking relay and is energized to apply the proper approval mark indicated by the lever 81 at the beginning of the recording pulse. At the termination of the recording pulse, the locking relay set is returned to the inactivated position in which it is shown, and is ready for the next recording pulse.

Another technique for preventing multiple recording by vacillating observers utilizes an approval control deenergizing switch cooperating with the feed step marking lever 1—91 for opening the circuit supplying the approval recording solenoids after the lever completes a punch stroke. When an approval record energizing pulse is initiated, as by the movement of timer arm 92 into circuit-closing contact with one of the fixed contacts 93 or by manual operation of the by-pass switch 97, the feed step marking solenoid 1—51 is immediately actuated to punch the desired feed step mark. At the end of this punching stroke an extension of the corresponding punch lever 1—91 may engage and lift the movable blade of the approval control deenergizing switch. Between the initiation and termination of the feed step indicating stroke any one of the approval indicating markers will be energized depending upon the position of the control lever 81. This interval is made short enough to limit the approval marking action to a single marking impulse even though the control lever 81 is being rapidly shifted from one approval position to another. The approval indicating interval may be adjusted to any desired period, as by providing a suitable time delay in the feed step marking action. Thus a time delay relay or dashpot may be utilized to complete the step marking circuit connection a short interval after the initiation of the recording pulse through the energizing leads 103—A, 103—B, etc.

The arrangement for preventing a change in vote during any one recording impulse may be omitted, as by directly connecting the energizing indicator 102 to the movable switch contact of arm 81, and directly connecting the three leads from the approval solenoids 1—50, 1—52 and 1—53 to the respective contacts 1—73, 1—74 and 1—75.

Delay means such as a dashpot may be used to delay energization of the tape advancing mechanism until after the punches pass through their retracting stroke. Retaining latch elements are shown in Fig. 1A as provided to assure that the advancing mechanism is kept in the proper position and is not inadvertently displaced between feed steps. As shown the sprocket shaft carries a holding cam 1—97 against which a retaining latch 1—98 is resiliently pressed. The latch fits in hollows in the cam periphery and prevents the rotation of the cam by any but sizeable forces having an order of magnitude corresponding to the forces supplied by advancing solenoid 40. The latch also assists in accurately positioning the advancing mechanism at each step. A similar yieldable latch 1—99 is shown for the advance switching cam 1—78.

The marking record sheet 1—17 for the construction of Figs. 1 and 1A may be any easily punched elongated tape such as one made of paper. It may be cut from a wide roll of paper and need not be pre-punched with the feed sprocket holes inasmuch as these are automatically supplied during use in apparatus of the type shown in Figs. 1 and 1A. The unperforated tape is prepared for use with this form of recording equipment of the invention by retracting the feed retainer 1—44, threading the tape in place, and anchoring the leading end to the take-up spool 1—33. The feed retainer 1—44 is then lowered to press the tape against the projecting sprocket teeth. In cooperation with the sprocket teeth receiving slot 1—46, the teeth pierce the paper tape and effectively mesh with it. The tape is now advanced in steps, and the step-marking punch 1—61 actuated at each step to provide a sprocket hole. This is repeated until at least the entire length of tape between the punches and the feed sprocket contains a row of punched sprocket holes. The apparatus is now ready for receiving records of program approval, the punched row of holes providing the desired accurate tape feed.

The pressing action of the feed retainer 1—44 may be adjusted so that it is normally insufficient to cause penetration of the sprocket teeth through the unpunched paper. The retainer may be manually held in firmer paper penetrating engagement during the pre-punching of the sprocket holes and the manual holding is discontinued when the apparatus is ready for receiving approval record markings. One convenient arrangement for pre-punching is provided by inserting a circuit-opening switch in the circuit branches 103—A, 103—B, etc., and manipulating this switch while keeping the feed retainer pressed down and the energizing circuits closed as by locking switch 97 in its circuit closing position. The additional circuit-opening pre-punching switch may also include a set of contacts for disabling the approval indicating punches 1—60, 1—62, 1—63, so that the final record clearly shows by the absence of approval indicating marks, where the pre-punching ended. The mounting of the circuit-opening pre-punching switch should be such that it is not readily accessible to the program observer, as by placing it inside the recorder unit where it can be readily operated when a record sheet is changed.

Alternatively the feed retainer 1—44 may be sufficiently strongly biased to cause penetration of the paper by the sprocket teeth, without requiring manual assistance. In this arrangement the tape needs no preliminary punching but is ready for directly receiving approval record markings after the feed retainer is lowered against a properly threaded tape. Such operation provides a convenient indication of the record sheet zone or step at which the first approval record is made. This step contains the first punched feed hole, all earlier steps having the punctured and torn feed holes made by the piercing action of the sprocket teeth.

The form of the invention shown in Figs. 1 and 1A may be modified by using sprocket-hole containing record tapes so that no preliminary punching is required to prepare the equipment for use. The feed punch 1—61 may be eliminated from such a modification and the other components altered to simplify the construction.

As indicated, the control lever 81 is biased to the neutral approval position. This assures that in the absence of a definite control movement by the observer, the apparatus will indicate a neutral reaction. Accordingly, at each program analyzing step a record of some degree of approval is made. This feature also assists in the identification of the program steps particularly where the sprocket-hole containing record tapes are employed as explained above.

Fig. 1B shows, partly broken away, a typical completed record of approval. The tape 1—17 contains a row of distinctive feed sprocket holes 1—36 together with the approval indicating punch marks 1—55 distributed among other rows corresponding to the various grades of approval.

The apparatus shown at Fig. 1 makes a highly convenient and useful audience-reaction system. Each member of the audience is provided with a signal unit such as 13—A and is instructed to operate the signal arm 81 to the center or neutral position for indicating a fair amount of approval, moving it to one of the side positions to indicate greater approval and to the other side position for indicating less approval. The performance is then initiated and the timer synchronizes by suitable operation of the timer switches 96, 98. At predetermined portions of the performance representing points where audience evaluation is especially desired, set beforehand by the positioning of the contacts 93 on the contact ring 90, an energizing pulse is provided to the recording unit actuating the advancing solenoid 40 and the punching solenoids 1—50, 1—51, depending upon the position of a signal unit.

After the completion of one or more performances the tape records may be collected and marked as to the statistical characteristics of the observer whose approval it has recorded. The tapes may then be run through a card punching machine for preparing a set of statistical cards such as shown in Fig. 5A from a collection of which any desired information as to audience response to various types of performances may be simply collated. One suitable card punching machine is the type 040 Tape Controlled Card Punch available through the International Business Machines Corporation which readily and automatically transfers data from the tapes to a set of cards.

During this card preparing operation additional punching may be made to incorporate in the card data the statistical information with respect to the type of observer from which the approval analysis was obtained. Thus, for example, a card may have a series of record position rows as indicated at 18—1, 18—2, 18—3, with successive column steps indicating the type of approval of the corresponding performance steps. The card may also contain additional rows subdivided into steps corresponding to the profession of the observer as well as the age and sex.

Accordingly, at any time that it is desired to determine how a particular form of performance point is received by a certain type of audience, it is only necessary to run the pertinent cards 17 containing the data with respect to a performance, including the specific performance point in question, through a statistical card sorting machine set to the particular rows and columns of data. The desired information is thereby available in a matter of seconds.

Figure 1C illustrates one method of arranging the audience reaction analyzing system of Figure 1. The auditorium may include a number of seats, 1—80, arranged in columns and rows. The individual records units 15—A, 15—B, etc., may be secured to the individual chairs within easy reach of a seated observer. Each recording unit is connected to the corresponding signal units through cables 1—81 and to the main power supply through cables 1—82 which may be merely placed upon the floor underneath the seats.

A feature of the invention shown in Figs. 1, 1A and 1C is the fact that only two connections 101, 102 are needed for each recording unit and the recording units are merely connected in parallel. The entire system can be very easily constructed, is entirely devoid of complicated cable networks, and is readily applied and removed from the auditorium. This is of considerable importance where no permanent program-presenting location is available or where the fixing of special permanent cables cannot be undertaken for other reasons. The branched two-wire circuit connections may be prepared very simply and require no special connections to any particular terminals of the power circuit or recording unit. Alternating or direct currents may be used for energization and will function satisfactorily with their terminal leads reversed. A low voltage of the order of twenty-four volts or less may be utilized in the electrical system to minimize any electrical hazards such as might result from directly contacting the conductors.

The recording units may be detachably held in place as by spring type clamping connections. Each spring type connection may comprise a socket member secured to the chair and a plug member forming part of the unit attached, so that the units are secured in position by merely bringing the plugs to the sockets and pushing them together until they engage. Alternatively the recording units may be semi-permanently secured in place as by screws so that they need not be moved but may merely be disconnected as by using plug-in type connectors for the cables. The signal units may be used in unmounted condition as for example with armless chairs or for more comfortable manipulation by people who may prefer to use different hands for signalling.

Fig. 2 shows another form of approval recording apparatus for the invention. This construction is a simplified modification in which the record marking mechanism does not include a feed hole punch. Furthermore, only two marking punches are utilized to indicate the various degrees of program approval in only two rows of punchings. This one punch is arranged to indicate good approval, and the other, a poor reaction. An intermediate or neutral approval reaction is indicated by the absence of either mark.

As diagrammatically shown, the apparatus may be energized by a two-wire system in a manner similar to that of the construction of Fig. 1. The record assembly is made in two parts, a record unit, several of which are indicated at 15—A 15—B, 15—C, 15—D, 15—E, etc., and corresponding control units 13—A, 13—B, 13—C, 13—D, 13—E, etc. The record unit 13—A is shown as operating with a record sheet in the form of a tape 2—17 which is moved through a marking assembly 2—20 by an advancing mechanism 2—22. An advancing solenoid 40 directly connected in the branched two-wire current distributing system is arranged to actuate an advancing lever 2—24 pivoted at 2—26. An advancing pawl 2—30 connected to the advancing lever 2—24 coacts with an advancing ratchet 2—32 for rotating a feed sprocket 2—34 in a manner similar to that described in connection with Fig. 1A. The advancing lever 2—24 biased to a rest position as by the spring 2—29 is also arranged so that at the completion of an advancing stroke it closes a marking switch 2—40 to energize the marking assembly. This assembly includes a pair of marking punches 2—53, 2—54 slidably guided in a guide block 2—56 and held in retracted position in which they are shown, by springs 2—58. The lower punching end of the punches is supported in apertures in the guide block 2—56 below which any aligned portion of the record tape 1—17 in the marking channel 2—38 may be punched out in the manner shown in Fig. 2A at 2—55. Below the guide block 2—56 is a matrix block 2—62 also perforated for receiving the punches 2—53, 2—54 and permitting passage of the punched-out portion of the paper tape. Perforation is effected by operation of one of a pair of punch operators 2—66 pivotally held on a fixed portion of the unit as indicated at 2—65 and arranged as armatures of punching solenoids 2—50, 2—51. When one or other of the punching solenoids 2—50, 2—51 is energized, the corresponding punch armature 2—66 is pulled downwardly, causing the lower end of the punch 1—53, for example, to be brought through the tape thereby perforating it. The recording units 15—B, 15—C, etc., may be similarly constructed.

The signal unit 13—A includes a pivoted operating arm 81 which may be biased to a neutral position as by the oppositely acting springs 2—70, 2—71. A movable contact 2—72 secured to the arm is arranged for closing a circuit with one of two fixed contacts 2—74, 2—75, upon movement in either direction from the neutral position in which it is illustrated. Engagement of the movable arm 2—72 with the contact 2—74 closes the circuit energizing punching solenoid 2—50. Engagement with the other fixed contact 2—75 energizes punching solenoid 2—51 while the neutral position of arm 2—72 prevents energization of either solenoid. Accordingly the punched record tape 2—17 will provide an indication of the position of signal arm 81 depending upon whether the perforations are aligned with punches 1—53, 1—54, or are entirely absent.

The system of Fig. 2 may be used to prevent excessive record marking as a result of changes of the observer's mind. For example, the actuating surges delivered to the distributing conductors 101, 102 may be of limited duration insufficient to permit more than a single punch operation.

Figure 3 shows a modified form of the invention. In this arrangement an auditorium 11 bounded by walls 12 may be similarly adapted for seating the members of the audience or the observers on a plurality of rows of seats, the location of representative seats being indicated by the location of the signal units 13—A to 13—F. Separated and isolated from the auditorium there is provided a recording space or room 14 in which are located recording means indicated by an array of a plurality of recording units 15—A, 15—B, 15—C, etc., corresponding to the individual signal units, 13—A, 13—B, etc., provided adjacent the seats on which the observers or the members of the audience are seated while attending the performance, one recording unit being provided for each of the signal units.

There is further provided a supervising or control station 16 which may be separated from the auditorium and from which the performance on the stage as well as the members of the audience may be continuously observed as through a window and a microphone amplifier system. The supervising or control station 16 may be provided with motion picture cameras and motion picture projectors, sound recorders and sound reproducers for either making a motion picture and sound record of the performance as it is going on on the stage or for projecting on a screen and reproducing in front of the audience a motion picture or a radio program which is to be evaluated.

Figure 4:
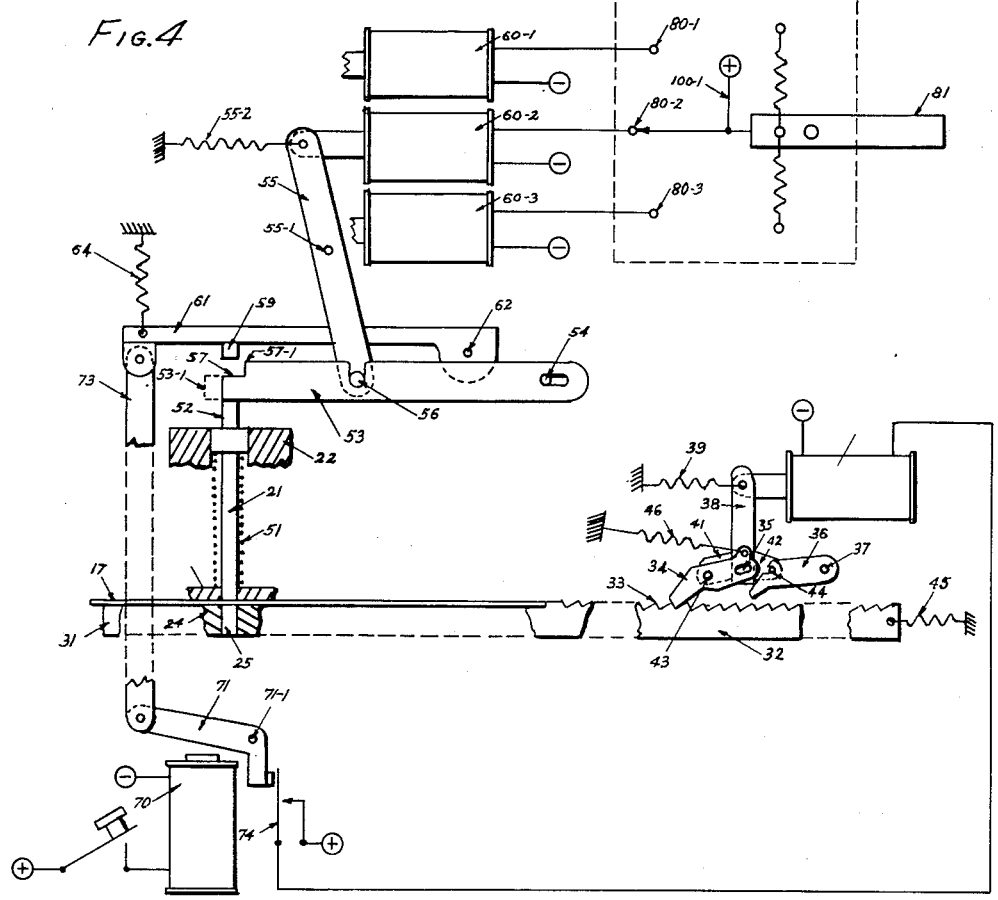
Fig. 4 is a diagrammatic detailed view of the cooperative relationship of the principal parts of a recording unit suitable for use with the system shown in Fig. 3.
Figure 5:
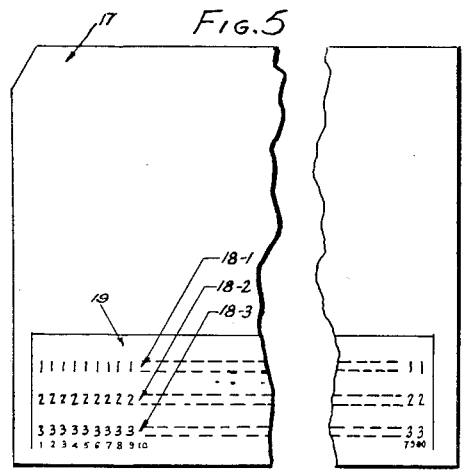
Fig. 5 is a plan view of a card suitable for use in the reaction analyzing system of Fig. 3.
Figure 5A:
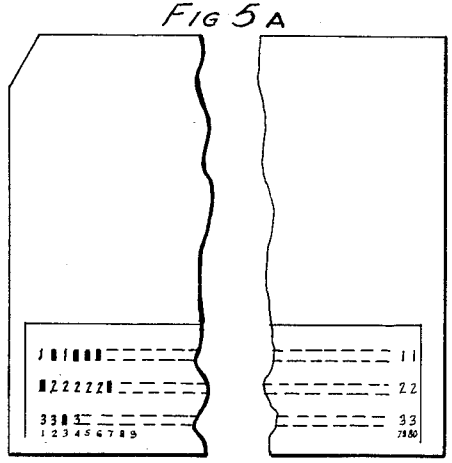
Fig. 5A is a similar view of a punched card such as provided by the systems of Fig. 1 or 3.

Each of the individual recorder units 15—A, 15—B, 15—C, etc., may be formed of a standard card punching machine of the type manufactured by the International Business Machine Corporation for recording information in successive columns of a statistical record card 17, such as shown in Fig. 5. In Fig. 4 there is shown in simplified diagrammatic form the principal parts of a simplified record punching machine equipped with three punches for selectively punching a hole in one of three record position rows 18—1, 18—2, 18—3 of successive parallel columns 1 to 100 of a record region 19 extending across the width of the card 17.

The recording machine units 15—A, 15—B, 15—C, etc., may be of the type described in Lee et al. patent 1,976,618, and its principal cooperating elements are indicated in Fig. 4. Each recording machine unit is provided with a row of three punches 21 suitably guided in guide block elements 22, 23 for selectively punching holes in one of three position rows of the record region of the card 17 guided between the guide block 23 and the matrix blocks 24 having a row of three holes 25 aligned with the cutting end of the three punches 21. The three similar punches 21 are arranged so that any one of the three punches may be actuated to selectively punch a hole or perforation in any one of the position rows 18—1, 18—2, 18—3 of a card column held aligned opposite the row of punches.

Each recording unit is provided with a card carrier element or carriage 31 suitably guided in the frame structure of the mechanism and arranged to be advanced step by step so that successive columns, such as columns 1 to 100 of the record region 19 are successively brought into alignment with the row of three punches 21. In the mechanism shown in Fig. 4, the card carrier advancing mechanism comprises a rack bar 32 which is connected to or extends from the card carrier 31 and is provided with a row of teeth 33 shaped for cooperation with a stepping dog 34 suitably journalled on a rocking shaft 35 and a locking dog 36 pivoted on a suitably fixed shaft 37. The rocking shaft 35 is arranged to be rocked back and forth by an arm 38 suitably affixed to the shaft and arranged to be rocked by a solenoid magnet 40, the armature of which is pivotally connected thereto for rocking it against the biasing action indicated by a biasing spring 39.

The rocking shaft 35 has also affixed thereto two oppositely extending rocker arms 41, 42. Rocker arm 41 has a laterally projecting pin 43 engaging a large opening in the stepping dog 34. Rocker arm 42 has a laterally projecting pin 44 engaging a slot formed in the locking dog 36. The card carriage with its rack bar 32 is subjected to a biasing action indicated by the tensioned biasing spring 45 and the card carriage 31 is arranged to be retained in each of the successive column positions by the engagement of the stepping dog 34 with the successive teeth 33 of the carriage rack 32.

When the rocking shaft 35 is rocked by the solenoid 40 in clockwise direction, as viewed in Fig. 4, the rocker arm 41 will lift the stepping dog 34 out of the notch of the carriage rack 32, and, at the same time, the other rocker arm 42 will depress the locking dog 36 into a notch between the underlying successive teeth of the rack bar 32 for holding it locked in the position shown. As soon as the stepping dog 34 is lifted out of the tooth notch by the rocking motion of the rocking shaft 35, it will be pulled forwardly and advanced a short distance by a biasing spring 46 connected thereto, the distance of the forward advance being sufficient to permit the stepping dog 34 to rest upon the top of the tooth with which it is shown engaged in Fig. 4.

When the carriage advance or stepping solenoid 40 is de-energized, the biasing spring 39 imparts to the rocking shaft 35 a returning rocking motion in counter-clockwise direction and causes it to raise the locking dog 36 out of locking engagement with the teeth of the rack bar 32 so that it may be advanced by the biasing spring 45 to the right, as viewed in Fig. 4, while the stepping dog 34 rides on the teeth of the rack bar 32 on which it rests until the front end of the stepping dog 34 strikes the next tooth of the rack bar 32 and arrests it with the card carriage 31 in the next column position. The card carriage 31 with the statistical card 17 carried thereby may thus be advanced so as to bring successive column positions of the record region 19 of the card into alignment with the row of three punches 21 by sending successive current pulses through the advancing or stepping magnet 40.

Fig. 4 illustrated only one of the three punches 21 of the recording mechanism. Each of the punches is arranged to be actuated from the inoperative retracted position in which punch 21 is shown in Fig. 4 to the operative position in which it punches an opening or perforation in the underlying row position of a card column. Each punch is normally held in its raised inoperative position as by a coil spring 51 which is interposed between the enlarged head of the punch 21 and the lower guide block 23.

The punch 21 is shown provided with an upper projection 52 on which rests the lower face of an interposer bar 53, one such interposer bar being provided for each of the three punches 21. Each interposer bar 53 has one end supported on a suitably fixed pivot pin 54 so that it may be advanced forwardly by the operation of a lever 55 having a pin 56 engaging a slot of the interposer bar so that a rocking motion imparted to the lever 55 will advance the interposer bar 53 from the full-line position shown to the forward dotted-line position 53—1.

The forward end of the interposer bar 53 has a notch 57 arranged so that when the interposer bar 53 is advanced to the forward dotted-line position 53—1, a projection 59 of a depressor or actuating plate or member 61 will engage a shoulder portion 57—1 of the interposer bar 53 and impart through it a downward punching motion to the punches 21 for punching a hole or perforation in the card whenever the depressor or actuating member 61 is rocked in downward direction around its pivot 62 against the biasing action indicated by a spring 64 which maintains the actuating member 61 in the raised inoperative position. When the interposer bar 53 is in the normally retracted full-line position shown, the downward motion of the punch actuating member will not impart any punching motion to the punch 21 underlying its associated interposer bar 53, because the operating projection 59 of the punch actuating member 61 will pass freely into the notch space 57 of the interposer bar 53.

As explained before, each of the three punches 21 of the recorder unit cooperates with one of three interposer bars 53, and the three interposer bars 53 are selectively advanced from the retracted inoperative position to the forward operative position by the operation of one of three solenoids 60—1, 60—2, 60—3, Fig. 4 showing only parts of the solenoids 60—1, 60—2, 60—3 associated with the other two punches 21 of the recorder unit. As shown, each of the punch actuating solenoids 60—1, 60—2, 60—3 has its armature pivotally connected to the rocker lever 55 of the respective interposer bar 53, the rocker lever 55 being pivotally mounted at 55—1 and being biased as by a biasing spring 55—2 so that only when the operating solenoid, such as solenoid 60—2, of the selective punch is energized, one of the interposer levers 55 will be rocked against the biasing action of its biasing spring 55—2 to advance a selected interposer bar to its forward operative position so that upon actuation of the punch actuating member 61 only the selected punch will be actuated to punch a perforation in the underlying card position.

In other words, a selectively operated punch mechanism of the type shown is arranged so that by selectively energizing either one of the three interposer operating solenoids 60—1, 60—2, 60—3, indicated in Fig. 4, the interposer bar of one of the three punches is advanced to its forward position so that a downward punching operation imparted to the punch actuating member 61 will cause the corresponding punch 21 to punch a perforation in the underlying card position. The operation of the punch actuating member 61 is controlled by an additional solenoid or magnet unit 70 having an armature 71 pivoted at 71—1 and connected through a link 73 to the punching actuating member 61, so that whenever the magnet 70 is energized, its armature, and therethrough the punch actuating member 61, will be actuated to the operative position for imparting to one of the three underlying forwardly advanced interposer bars 53, and therethrough to its underlying punch, a punching motion for punching a perforation in the card position corresponding to one of the three interposer bar advancing solenoids 60—1, 60—2, 60—3 which has been selectively energized by control means of the system.

As indicated in Fig. 4, the armature 71 of the punching magnet 70 is also utilized to operate switch contacts 74 which complete an energizing circuit for the carriage stepping magnet 40 of the card advancing mechanism, so that each time a punching operation is performed and the punching solenoid 70 is energized, its switch 74 will be operated to energize the card advancing magnet 40 in such manner that when the punching solenoid is released to its normal position, the card carriage 31 with the card 17 carried thereby will be advanced by one step, thereby bringing the next card column of the record region 19 of the card into alignment with the row of punches 21.

Referring to Fig. 3 showing one form of the system of the invention, each of the signal units 13—A, 13—B, etc., provided for each observer of the audience, has a pivotally mounted lever or key 81 movable between three positions, in which a switch operating element thereof connects one of its three switch contacts 80—1, 80—2, 80—3 to a lead 100—1 from one terminal of a source of electric energy, indicated by the plus sign, depending on the position of the switch key 81. Each of the switch keys 81 is arranged to be biased, as indicated by conventionally shown biasing springs, to a neutral intermediate position in which it establishes a circuit connection with its intermediate switch contact 80—2.

Each member or observer of the audience is instructed to operate the switch key 81 of the switch unit associated with his seat so as to selectively tilt the switch key from its neutral position in one direction, for instance, in the forward direction when he enjoys the program or in the opposite direction when he dislikes the program, and to leave the key 81 alone and permit it to return to its neutral position when the performance does not affect him one way or the other.

As indicated in Fig. 3, each of the recording units 15—A, 15—B, etc., is provided with a recording equipment of the type described in connection with Fig. 4 and comprising three punch selector solenoids 60—1, 60—2, 60—3, a punch operating magnet 70 having an armature which closes switch contacts 74 whenever the punch magnet is energized, and a card carriage advancing solenoid 40 which is automatically energized each time a punching operation is performed so as to advance the statistical card of the recording unit to the next punching position.

The punch selecting solenoids 60—1, 60—2, 60—3 of each of the recording units 15—A, 15—B, etc., are connected to the switch contacts 80—1, 80—2, 80—3 of the associated signal switch units 13—A, 13—B, etc., so that depending on the reaction of the observer to the performance, punch selector solenoid 60—1 will be energized when the switch key 81 has been tilted from its neutral position to indicate that the observer, for instance, likes the program, and that punch selector solenoid 60—3 will be energized when the observer tilts the key 81 to the opposite position to indicate that the observer dislikes the program, and that the punch selector solenoid 60—2 will be energized when the observer leaves the key 81 in the neutral position when he is not affected by the program and does not react to it one way or the other. With such arrangement, the recording unit provided for each observer of the audience, such as a recording unit 15—A which is connected to the signal unit 13—A, will have one of its three interposer bars advanced to a punching position depending on the position of the key 81 of the switch unit. However, no punching operation would be performed on the card unless the punching magnet 70 is also energized.

The punching magnet 70 of the array of recording units 15—A, 15—B, etc., is controlled not by the members of the audience, but by synchronized control means operating in synchronized relation to the progress of the performance. The synchronized control means for substantially simultaneously operating all the punching units or punching solenoids of all the recording units 15—A, 15—B, etc., of the system in accordance with the progress of the performance, may be provided by a variety of different control equipments. Thus, for instance, as indicated in Fig. 3A a talking motion picture film 83 which is used to deliver the performance may be provided with synchronizing elements, such as transparent spots, as indicated at 84, along an opaque border region 85 of the film associated with all the highlights of the performance. Transmission of light through the transparent spots or slots 84 actuates a photocell 86 connected to a translating circuit section 94 so as to supply a control impulse serving to momentarily energize a relay which completes a circuit through which all of the punch operating magnets 70 of all the recording units are simultaneously energized to perform a punching operation on all of the recording units 15—A, 15—B, etc., for punching in the proper card column corresponding to the desired portion of the program a record expressing the reaction of the different members of the audience to the program. The equipment of Fig. 3A also has the usual source of light 95 and a focusing device 96 which focus a ray of light on the border portion 93 of the film.

In Fig. 3, if the performance consists of a live program, a clock-driven contactor mechanism of the type indicated in Figs. 1 and 3 may be utilized to provide the synchronized control action for controlling the operation of the recording unit and cause the individual recording units to selectively record the reactions of the audience in a predetermined synchronized relation to the progress of the performance. Thus, a clock motor 91 may be arranged to rotate a contact arm 92 of a clock switch unit along a circular row of contacts 93 for completing a circuit from an energy supply lead 101—1 to one terminal of all of the punch operating magnets 70, the other terminal of which is connected to the opposite terminal of the supply source indicated by the minus sign.

By arranging the clock operating switch mechanism 90 so that it transmits an energizing impulse to all the punch magnets 70 of all recording units 15—A, 15—B, etc., of the system, at predeterminedly spaced intervals of the program throughout the entire duration thereof, while the program is being recorded or played back from a record, the system of the invention makes it possible to obtain an array of cards indicating in the array of parallel columns of each card the different reactions of each member of the audience to the different portions of the program corresponding to the different column positions of each card. The array of punched statistical cards may then be readily used with any standard statistical analyzing machines for evaluating by known mechanical statistical methods the various features of the program, since the record punched on each column of the card is associated with a predetermined portion of the recorded program or performance.

As indicated in Fig. 3 the card advancing switch contacts 74 of only one of the recording units, namely, the recording unit 15—A, may be utilized for energizing all of the card advancing solenoids 40 of all the recording units 15—A, 15—B, etc., of the system. Furthermore, an auxiliary push-button operated switch 95 may be provided so that the supervisor who watches the program from the control room 16 may, at will, advance the cards of all the recording units to a desired column position by operating the switch contacts 95 the desired number of times. The synchronized control unit 90 of the system may be selectively rendered operative or inoperative by closing or opening a push-button operated switch 96.

In addition, the supervisor may at any time during the progress of the performance, while the synchronized control mechanism 90 is in operation, actuate all the punching magnets 70 to punch on a selected card column of all the cards a record corresponding to the momentary reaction of all the members of the audience by momentarily actuating a push button switch 97 without otherwise disturbing the operation of the synchronizing control unit 90. The synchronized control switch 90 may also be provided with a visual indicator having indicating positions, for instance, 1 to 100, corresponding to the column positions 1 to 100 of the cards, so that an indicating pointer which rotates simultaneously with the contact pointer 92 may indicate to the supervisor the momentary column positions of all the cards in the different recording units of the system.

As explained above, each chair or seat in the auditorium may have its signalling unit mounted on the chair so that each observer may push his signal key 81 forward when he likes the program or pull it back when he dislikes it, as instructed before the program is started. The audience composed of as much as 200 or 300 observers may thus be readily instructed how to operate the signal units associated with each seat. The performance is then started with the entire audience seated and ready to observe the performance.

If a clock controlled contact system, such as indicated at 90 is utilized to control the operation of the system, the synchronous motor 91 is energized simultaneously with the start of the performance, after the switch 96 has been first closed. Alternatively, switch 96 and the motor energizing switch 98 may be interlocked so that they are simultaneously closed. With such arrangement, each of the recording units associated with the respective seats will be automatically operated every five or ten seconds during the progress of the performance. As a result, the different reactions of the different observers seated in the auditorium will be recorded on successive columns of the array of cards every five or ten seconds of the continuing performance, the individual column positions of the card corresponding to definite successive movements of the performance.

The array of cards may then be analyzed by the standard statistical analyzing equipment for determining in a standard statistical manner the overall reaction of the audience to the features of the performance. Furthermore, a supervisor who watches the performance and follows it in conjunction with a script may send punching signals to all the punching magnets by momentary actuation of switch 97 when it is desired to obtain the reaction of the audience to a particular part of the performance.

A feature of the form of the invention of Figs. 3 and 4 is the interlocking arrangement whereby a faithful and clear record is made of the approval characteristics of the program in spite of any change in position of the signal arms after the audience has placed them in their desired locations. Thus the positions of the signal arms may become shifted from the proper approval position either inadvertently or because of a change of heart of one or more individuals. The apparatus is so arranged that upon the actuation of a recording impulse, the initial positions of the signal arms are recorded and any subsequent movements during the impulse are of no effect.

As shown in Fig. 4, each approval punch 21 is operated by the punching solenoid 70 only if the selector shoulder 57—1 is brought into the operated position under a corresponding punching projection 59. When the punching impulse energizes the solenoid 70 all the punch actuating plates 61 are pulled down and a punching is immediately made by the punch 21 corresponding to the specific punching shoulder selected by the signal circuit just previously to the impulse. Any later change of the selector arm position is ineffective for making a second punch during the continuance of the same recording impulse inasmuch as previously retracted punching shoulders 57—1 in the position shown in full lines in Fig. 4, cannot be brought under the corresponding downwardly held punching projection 59.

In accordance with this phase of the invention, the operation of an audience, reaction analyzing system of the type described above is rendered foolproof, and critical difficulties encountered with the operation of such systems are avoided by combining therewith interlocking or preventive means operating automatically in response to the initiation of a control action to prevent changes in the signal member positions of the different signal units—reflecting changes in the reactions of the observers operating the signal units—from upsetting or modifying the punching operations performed by the array of punching units on their respective cards, or, in other words, to assure that upon initiation of a punching operation sequence in response to a control action, the punches of the different recording units will be actuated to punch corresponding records in their cards in accordance with the signal member positions of the different recording units at a predetermined moment following the initiation of a control action.

Fig. 6 illustrates diagrammatically how an audience reaction analyzing system of the type described above in connection with Fig. 3 may be combined with a different form of interlocking or preventive means in accordance with the principles of the invention. The system of Fig. 6 has an array of signal units 13—A, 13—B, etc., combined with the different seats or seating stations of the auditorium 11 and arranged for co-operation with an array of recording units 15—A, 15—B, etc., located in a recording space or recording room 14, and provided with punch selector solenoids 60—1, 60—2, 60—3, and a punch actuating solenoid 70, as in the system of Fig. 3. Each of the recording units is also shown provided with a card carriage advancing solenoid 40 actuated to advance the carriage between each successive punching operation, in a manner analogous to that described in connection with Figs. 3 and 4.

The system of Fig. 6 is also provided with synchronized control means operating in synchronized relation to the progress of the performance for actuating the different recording units to record on their respective statistical cards the different reactions of the observers or the members of the audience as the performance progresses. The synchronized control means of Fig. 6 are shown formed by a clock motor 91 provided with a suitable reduction gearing through which it rotates a contact arm 92 of a clock switch unit 90 along a circular row of contacts 93 for completing a circuit from an energy supply lead 101—1 to one terminal of all of the punch operating magnets 70 of the different recording units 15—A, 15—B, etc. for causing them to punch on their respective statistical cards a record corresponding to the momentary reaction of the different observers associated with the different signal units 13—A, 13—B, etc.

As indicated diagrammatically in Fig. 6, the driving connection between the clock motor 91 and the synchronized control unit 90 is also interconnected with program record equipment 10 so that the operation of the control unit 90 shall be positively synchronized with the progress of the performance. The record equipment 10 may be formed of a talking motion picture assembly which supplies the audience with a talking motion picture performance of a previously recorded program. Alternatively, the program equipment 10 may be formed of a motion picture camera and sound recording equipment which records a live performance as it progresses in front of the audience.

The switches 95, 96, 97 of the system of Fig. 6 are arranged to perform the functions of the similar switch elements of Fig 3. The system of Fig. 6 is also shown provided with one form of interlocking or preventing means for preventing a change in the position of the key member 81 in the different signalling units 13—A, 14—B, etc., of the system from modifying a punching operation performed on the statistical cards of the array of corresponding recording units whenever a punching operation has been initiated by a synchronized punching impulse transmitted from the control unit 90 to the punch actuating means shown formed by the punching solenoid 70. To this end, each recording unit 15—A, 15—B, etc. is provided with a set of three auxiliary relays 83—1, 83—2, 83—3 interconnected between the punch selector solenoids 60—1, 60—2, 60—3 and the corresponding contacts 80—1, 80—2, 80—3 of the associated signal switch unit 13—A, 13—B, etc. so that depending on the position of the key 81, one of the three auxiliary relays 83—1, 83—2, 83—3 will be energized and operate one of its sets of two contacts to complete a circuit to the selected punch selector solenoids 60—1, 60—2, 60—3. Each of the auxiliary relays 83—1, 83—2, 83—3 is also provided with locking contacts which are operated to establish a locking circuit which keeps the relay energized in the operative position whenever it is energized by the operation of the switch key 81 of the respective signal units.

It will be noted that the energizing circuits for the auxiliary relays 83—1, 83—2, 83—3 established by the signal key 81 in any one of its three positions 80—1, 80—2, 80—3, are shown completed through normally closed contacts 85—1 of an interlocking relay 85 through which the movable element of switch key 81 is connected to the lead 101—1 from one terminal of the relay supply circuit indicated by a plus (+) sign. The relay 85 is arranged to be operated by an energy impulse supplied thereto by the operation of the control unit 90 whenever an energy impulse is supplied to the punch actuating magnet 70 of the individual recording units 15—A, 15—B, etc.

When the interlocking relay 85 is operated, it opens at the contacts 85—1 the circuit connections of all of the signal switches to the energy supply lead 101—1, thereby incapacitating the signalling unit from performing any further control action as long as interlocking relay 85 is in the energized or operated position. When the interlock relay 85 is operated, it also closes a set of contacts 85—2 through which a lead 101—1 from the positive relay supply terminal is connected directly to a circuit conductor 102 which is interconnected with the contacts of the auxiliary relays 83—1, 83—2, 83—3 of each of the recording units, so as to establish a locking circuit for the auxiliary relay which was in the operated condition at the moment when the operation of the interlocking relay 85 disconnected the energy supply source from the switch contacts of the array of signalling units 13—A, 13—B, etc.

In other words, whenever the interlocking relay or interlocking means 85 are operated, each of the signalling units 13—A, 13—B, etc. is disabled from modifying the operating condition of the associated auxiliary relays 83—1, 83—2, 83—3 of each of the array of recording units, while at the same time establishing operating conditions which assure that the auxiliary relay unit which was in the operated position remains in the operated position so that the punch previously selected by the operation of the associated switch key 81 will be actuated to punch a record in the card of the associated recording unit as a result of the actuation of the punching magnet 70 by the energizing impulse received from the control unit 90.

The operation of the contacts of the interlocking relay 85 is so correlated with the operation of the auxiliary relays 83—1, 83—2, 83—3 as well as the operation of the punch actuating magnets 70 of each of the recording units and the operation of the switch contacts of the synchronizing unit 90, as to assure that one of the auxiliary relays 83—1, 83—2, 83—3, which was maintained energized by the associated selector switch key 81 at the moment when the control impulse was transmitted by the control unit 90, is retained in the operated position by the instantaneous action of the interlocking relay 85 in closing its contacts 85—2, while opening its contacts 85—1; and to assure that the punching actuating magnet 70 is operated and energized by the transmitted control energy impulse to cause the recording mechanism to perform a punching operation while one of the selected punch selector solenoids 60—1, 60—2, 60—3 is maintained energized by the operated position of the associated auxiliary relay. The relay 85 shown is of the type which closes its contacts 85—2 before opening its contacts 85—1.

According to another phase of the invention, the construction and operation of audience reaction analyzing systems of the general type described above are greatly simplified by combining a set of a plurality of recording units, for instance, 25 or more recording units, into a unitary recording structure provided with a common card carrier structure arranged to automatically advance a set of a corresponding plurality of cards past a set of recording sub-units of such common recording structure, and arranged to selectively punch the desired records along a record region of the individual cards.

Figure 7:
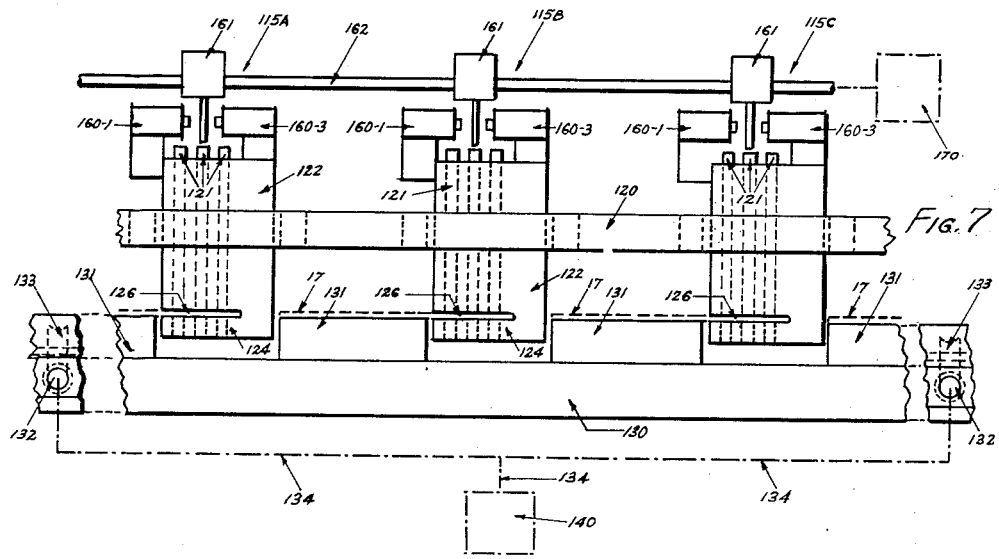
Fig. 7 is an end view of one form of a recording machine based on the principles of the invention.
Figure 8:
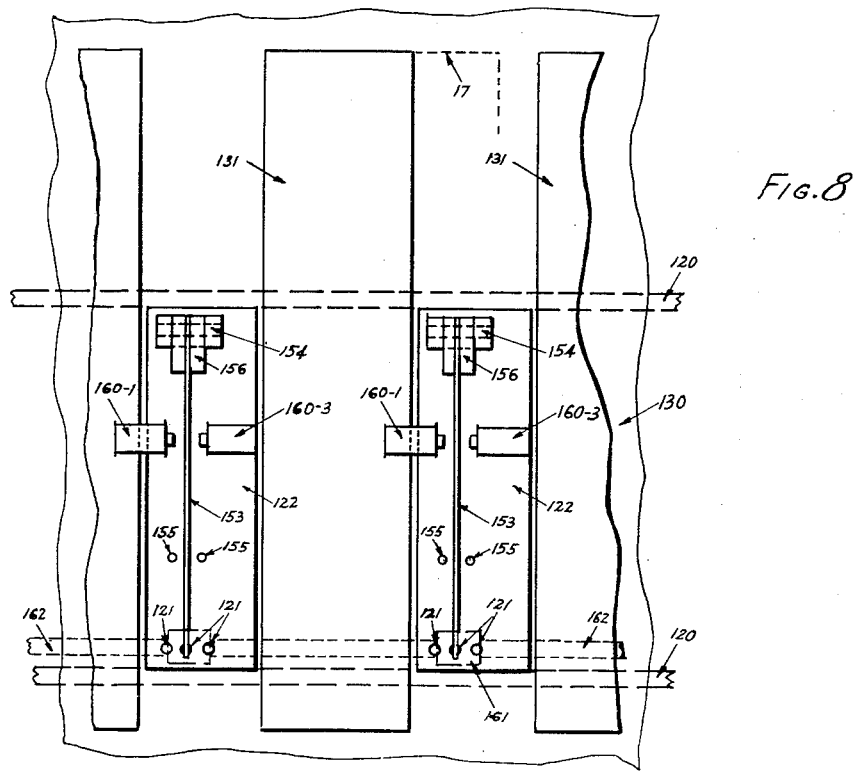
Fig. 8 is a plan view of a portion of the machine shown in Fig. 7.

In Figs. 7 to 9 is illustrated in a partially diagrammatic manner one form of the general arrangement of the elements of a common recording structure suitable for cooperation with a set of a plurality of signalling units of an audience reaction analyzing system of the type described above. The recording structure has a set of a plurality of recording units 122 held affixed to frame members 120 extending along the recording units so as to form therewith a common supporting structure for supporting and maintaining in their operative position the individual sets of punches 121 of each recording sub-unit 122.

A common card carrier structure 130 carries affixed thereto a plurality of card carrier units 131, each serving to support and advance a statistical card 17 along a slit 126 of the respective recording units 122 for punching records in successive columns of three record position rows of a recording region of a statistical card extending along a longer edge region of the card in the manner indicated in Figs. 5, 7 and 8. The several punches 121 may be guided in the recording sub-units 122 in a manner generally similar to that explained in connection with Fig. 4, so that when the outwardly projecting end of a punch 121 is actuated in the inward direction, it will punch a hole in an underlying record column position of the card held in the slit 126 of the respective recording units.

According to the invention, each recording unit 122 is provided with a novel form of interposer member 153 formed of a reed or strip having one end anchored in a pivot structure 154 and the other free end overlying the region of the upwardly projecting ends of the three punches 121 of the recording unit. The reed 153 is biased to a normal position in which its free end remains aligned above the intermediate punch of the three punches 121 of the recording unit. Two punch selector magnets 160—1, 160—3—corresponding to the punch selector solenoids 60—1, 60—3 of the system explained above in connection with Fig. 6—are held suitably affixed to the relatively rigid guide structure of the recording unit 122 so that when either one of the magnets 160—1, 160—3 is selectively energized, the reed 153 will be deflected to overlie the upwardly projecting end of one or the other of the two punches 121 positioned on the opposite side of the intermediate punch 121 over which the reed 153 is positioned in its released normal position.

Suitable stops 155 may be provided in order to fix the position of the reed 153 when it is deflected from its normal intermediate position shown by selective energization of one of the reed deflecting magnets 160—1, 160—3 in order to assure that when the reed is deflected, the end portion of the reed registers and is aligned with the underlying punch which is to be actuated by it to the punching position when an actuating force is imparted to the reed.

The pivot end of each interposer reed which serves to anchor the reed and provide for it a pivot connection with the pivot structure members 154 extending from the recording unit in the manner indicated in Fig. 9, is combined with means for causing the reed to be normally biased and retained at a level at which the forward region of the reed is free to move in the region above the upwardly projecting ends of the three punches 121 which are to be actuated thereby when a punching force is applied to the reed, the reed being free to pivot along the pivot axis 155 of its pivot connection in inward direction for imparting a punching motion to the underlying punch 121. The punching force may be applied to all the interposer reeds 153 of all the recording sub-units 122 of the common recorder structure either by a common rockably mounted rocker beam extending above all the reeds, or, as indicated in Figs. 7, 8 and 9, by the generally circular cam surfaces of eccentrically journalled cam elements 161 operated conjointly as by a common eccentrically positioned shaft 162 so that a single rotation imparted to the shaft 162 will cause the eccentric cam surface of the cam element 161 to depress the interposer reed 153 and cause it to impart a punching movement to one of the punches 121 underlying the forward region of the reed. It is obvious that the punch actuating cam surface elements 161 may be formed of a continuous cylindrical cam surface member provided at its opposite ends with eccentric shaft ends 162 suitably journalled so that one turn of a rotary motion imparted to one of the shaft ends of such cam structure 161 will actuate all the interposer reeds 153 of all the recording sub-units 122 of the recording structure to perform the desired punching operation.

The common carriage structure 130 carrying the individual carriage units 131 is arranged to be guided by guide means of a common supporting structure, in a manner analogous to the manner in which the card carriages of standard punch-type recording machines, such as described in connection with Fig. 4, are guided for advancing the card step by step past the punches of the associated recording unit and also provide for a return of the carriage to a position in which it picks up a card from the stack of statistical cards fed from the bottom of a hopper by the usual picker knife provided on the carriage, for instance, in the manner described in Lee et al. Patent 1,976,618 referred to above in connection with the description of Fig. 4.

In accordance with the invention, the common carriage structure is advanced or has imparted thereto the desired motion along the guideway by one or more worm gear connections formed, for instance, by a spindle 132 suitably journalled on the supporting structure and having a worm thread engaging the teeth of a worm gear 133 suitably journalled in the mounting elements of the carriage structure so that a rotational motion imparted to the worm spindle 132 will cause the carriage to be advanced in one or the other direction depending on the direction of the rotary motion imparted to the spindle.

In order to impart to the carriage drive spindles the desired driving motion, the spindles are connected to a driving unit 140 by a suitable motion-transmitting connection, indicated by dash-dot lines 134. The driving means 140 may be formed of a ratchet gear designed for cooperation with a stepping mechanism in a manner analogous to the cooperative relationship of the rack 32 and the stepping mechanism described in connection with Fig. 4, so that each time a stepping magnet, such as stepping magnet 40 of Fig. 4, is energized, the spindles 132 of the carriage structure will be turned to advance the entire carriage structure 130 with its carriage units 131 by one step. The drive unit for the carriage structure may also be designed so that each time the driving unit receives an impulse, it causes the carriage drive spindles 132 to make one turn and thereby advance the carriage structure with its card carriage units 131 by one step corresponding to the spacing between successive index position columns of the statistical cards, such as card 17.

In Fig. 10 is shown one form of a drive mechanism which will automatically cause a drive motor to impart to the spindle drive shaft 134 a single turn each time the drive unit receives a control impulse. As shown in Fig. 10, a drive motor 183 provided with a built-in gear reduction mechanism is arranged to drive a shaft, such as shaft 134, so that each time the control element, shown in the form of relay 180, receives an energizing impulse, the motor 183 will be energized to impart to the shaft 134 a one-turn rotation, the motor being brought to a stop at the end of one turn of the shaft 134. To this end, the drive shaft of the motor 183 is provided with two cam members 184, 186 having cam surface portions for controlling the operation of two cam switches 185, 187.

The drive mechanism 140 is also provided with a lock relay 182 and the various features thereof will now be described in connection with the following explanation of its operation: Upon momentary energization of the starting relay 180, its closed contacts 181 will energize the locking relay 182 and thereby actuate its contacts to the operated condition in which its innermost set of contacts will complete a locking circuit for the locking relay 182 including the normally closed contacts of cam switch 187 which is released by the cam projection of cam 186 to the open position shortly after the shaft 134 starts its turning cycle following the energization of the drive motor 183.

When the locking switch 182 is actuated to the operated position, it also energizes at its intermediate set of contacts the motor 183 and the energizing circuit leading from one terminal of the motor supply indicated by a plus (+), the opposite power supply terminal indicated by a minus (—) sign being shown directly connected to the motor. As soon as the motor starts to rotate, the turning motion imparted to its shaft will actuate its cam 184 to release its cam switch 185 to the operated position in which one of the contacts of the cam switch completes a motor energizing circuit which is parallel to the contacts of the relay 182 through which the motor 183 was energized. The motor shaft cam 184 has a cam projection so shaped as to release its cam switch to the operated position as soon as the motor starts rotating and maintain its cam switch in the operated position in which the drive motor 183 remains energized until—after completion of one cycle or one turn of rotation of the shaft 134—the cam 184 has been returned to the position shown in Fig. 3 in which its cam switch 185 is returned to the non-operated position in which it opens its motor energizing circuit.

As soon as the motor drive shaft 134 starts rotating, its cam 186 releases its cam switch 187 to the operated position in which it opens the locking circuit for relay 182, thereby releasing its contacts to the non-operated position in which they are shown in Fig. 10. However, the drive motor 183 keeps on rotating because it remains energized by the operated contacts of its cam switch 185, the motor being stopped only after the shaft 134 has completed one cycle or one turn of its rotary motion at the end of which its cam 184 returns its motor switch 185 to the non-operated position. As indicated in Fig. 10, the locking switch 182 as well as the cam operated switch 185 may be provided with an additional set of contacts serving to energize another motor 189 so that it rotates as long as the motor 183 is rotated.

For the sake of simplicity in following the circuits, the motors 183, 189 are shown as supplied from a D. C. power source indicated by plus and minus terminals, although as a rule the two motors will be alternating current motors and they may be designed to rotate their shafts in synchronism so that one rotation of the drive shaft of motor 183 corresponds to a desired number of turns of the drive shaft of motor 189. Since a drive control mechanism such as described in connection with Fig. 10 may be utilized to synchronize the rotation of any number of motors, such as the number of rotational cycles of the drive shafts of any number of motors, such as motor 189 shown, such mechanism may be utilized for imparting to the carriage drive spindles 132 one turn each time the starting relay 180 is energized, and to cause another motor to rotate its drive shaft connected to the spindle 132 for imparting thereto the number of turns required in order to return the carriage to any desired starting position in which the individual card carriage units 131 each pick up a new card from their associated hopper units suitably supported by the common supporting structure of the multiple unit punch recorder.

Audience reaction analyzing systems equipped with a multiple unit recorder of the type described above in connection with Fig. 10 may be automatically operated to record the reactions of the desired number of members of an audience by a control system of the type described above in connection with Fig. 6, the operation of which was previously explained in connection with a recording mechanism of the type described in connection with Fig. 4.

When an automatic control system of the type described in connection with Fig. 6 is combined with a recording mechanism of the type described in connection with Figs. 8 to 10, the control system of Fig. 3 will have to be suitably modified as follows:

The punch selector magnet 60—2 may be omitted because the interposer reed 153 will normally automatically return to the intermediate position without requiring a separate punch selector solenoid.

The functions of the other two punch selector solenoids 60—1, 60—3 will now be performed by the selectively operating reed deflecting magnets 160—1, 160—3 which will be connected in the operating circuit of Fig. 6 in lieu of the punch selector solenoids 60—1, 60—3 thereof.

In order to perform a punching operation each time a control signal is supplied either by the synchronized control unit 90 or by a push button switch 97, as explained above in connection with Fig. 6, a drive unit for the punch actuating cam structure 161, indicated at 170, may be provided. The drive unit 170 may have the form of the drive unit 140 described in connection with Fig. 10, the drive shaft of motor 183 serving, for instance, to impart one turn to the cam structure 161 for performing a punching operation each time the starting relay 180 is energized. With such arrangement, a starting relay, such as starting relay 180 described in connection with Fig. 10, is connected in the operating circuit of Fig. 6 in lieu of the punch actuating magnet 70 there shown.

In lieu of the carriage advancing magnet 40, a starting relay 180 of a carriage drive mechanism is arranged to be energized to cause the carriage structure with its carriage unit to be advanced between each two successive punching operations.

In order to provide the required selective energization of the starting relay, such as relay 180 of a carriage advancing drive unit 40 of the type described in connection with Fig. 3, a relay, such as relay 70 of Fig. 6 may be connected in a circuit which is completed by one of the operated contacts of the cam switch 185 of Fig. 10, serially connected with another cam switch operated by another cam on the motor drive shaft 134 so as to close its contacts only toward the end of one rotary cycle of the motor shaft corresponding to an operating condition in which the operated punch has been released from the operated position, and the rotation of the punch actuating cam 161 is about to be stopped by the de-energization of the drive motor, such as drive motor 183 of Fig. 10, just before the end of its one-cycle rotation.

When testing the reaction of an audience with an audience analyzing system of the invention, provision is made to record on each record card information indicating on the record card the characteristics of the member of the audience whose reactions are recorded on the particular card. This is of importance because in analyzing the statistical record cards obtained with such audience analyzing system, it is desirable to determine how different classes of individuals of different common characteristics react to different parts of the program.

In accordance with the invention, the desired information characteristic of each member of the audience is recorded on the card by punching a suitable code in a portion of the record region of the card, and one or more columns, for instance, the first two or three columns of the record region of each card is assigned for recording thereon such information. This information regarding the characteristics of the individual may be recorded on each card when the individual is interviewed before assigning him to a particular seat, and in such case, the card is assigned to the recording unit corresponding to the particular seat.

Another way to accomplish this object is to utilize a remote control machine, similar to a typewriter which is used to record on the card in a definitely identified recording unit assigned the information regarding the characteristics of the individual to whom a seat is assigned which is provided with the signal unit corresponding to the so-identified recording unit.

In accordance with another phase of the invention, an analyzing system of the general type described in connection with Figs. 1 and 2, utilizes an elongated strip of sheet material such as a paper tape, which is advanced step by step past a recording mechanism having three marking members selectively controlled by a handle, for producing on the strip an elongated dash mark each time the strip is advanced, so that depending on the reaction of the observer, the dash mark will appear either in the center portion of the paper tape or to the right or left thereof, in a manner analogous to the holes punched in the strip such as shown in Fig. 1B or Fig. 2A. The marking members of each recording unit may be formed either of pencils, or of ink pens, or a rod or pin which presses the tape against an inking ribbon similar to a typewriter ribbon, for selectively producing a dash mark at one of the three positions on the paper tape.

With such arrangement, the recording units are placed at each seat in lieu of the recording units described in connection with Figs. 1 and 2. Such arrangement of recording units requires only a single electrically actuated unit, namely a tape advancing member for advancing the tape under a common synchronous control, in the manner described in connection with Figs. 1 and 2. The tape with the dash marks is then utilized to prepare punch cards of the conventional type suitable for use in conventional statistical accounting machines, for analyzing the data, analogous to that described above in connection with the tape, by which the reactions of the observer are recorded by punching a hole in one or another of the three positions across the width of the tape.

Fig. 11 shows diagrammatically the arrangement of the circuit connections through which the array of the individual signal units, provided for each seat on which the members of the audience are seated, is connected to the individual recording units of the recording equipment located in the recorder space. A three conductor outlet jack box 201 is provided for each signal unit, and the three conductors leading from all the jack boxes of each row 210 of seats are laced into a branch cable 203 provided at its end with a detachable coupling terminal unit through which each branch lead 293 is detachably coupled to a coupling unit of a series of branch coupling units 211, formed on a main multi-conductor cable 212 leading from the auditorium to the recording space, and terminating therein in a series of numbered and orderly arrayed connecting terminals through which the individual sets of three conductors leading from each of the signal units located in the auditorium may be readily connected to their corresponding recording units, in such manner that each recording unit is connected to a definitely identified signal unit.

In other words, the wiring interconnection between the signal units and the recording units is formed of a main cable and branch cable which are connected through detachable coupling units to corresponding coupling outlet units provided on the main cable. Each branch cable is provided with a series of jack boxes for connecting thereto the signal units of the seats of a given row of seats, and the whole system of cable interconnections is so arranged that each signal unit associated with each seat leads to a definitely identifiable set of three conductors through which each signal unit is connected to a definitely identifiable recording unit.

Although the audience reaction apparatus of Fig. 1 is shown as including only two punches to each recording unit for indicating thus various audience reaction choice possibilities, a three punch assembly such as is shown in Figs. 3, 4 and 6 may also be used to positively record the "fair" or medium audience approval reaction in the simply wired arrangement of Fig. 1. If desired each recording unit may have a larger number of punches, 4 or 5 for example, to record finer gradations of approval reactions. One of the reaction gradations may be associated with a no-punch or multiple-punch circuit so as to record gradations in excess of the number of punches.

The apparatus of Fig. 1 may also be modified to include the interlocking features of Figs. 4 and 6 and limit the recording to the respective initial positions of the individual signal units. According to the invention the punching solenoids of a multiple punch recording unit include an additional set of locking switch contacts for opening the punch solenoid energizing circuit through the corresponding signal unit and locking anyone of the solenoids into operated punch position when it is actuated. A single pole double throw switching assembly may be associated with each solenoid and arranged so that the poles are normally biased to one throw position and movable to the other throw position when the corresponding solenoid is energized. The punch energizing connection to the signal contact arm such as arm 1—72 is completed through the two normally closed throw circuits in series. The other throw circuits are respectively arranged to shift the energizing circuit directly through the corresponding solenoid windings.

As an alternative embodiment of the invention, the record energizing pulses are arranged to be of only momentary duration so that in the small amount of time available, it is substantially impossible to shift the signal arm from one recording position to another. With this construction, the advancing and punching solenoids are of the rapid acting type for assuring the completion of a recording in this period of time.

Further audience response systems of the invention include completely wireless arrangements. The recording units of one such form are few in number and are placed together at a central station. Each recording unit is connected for operation by a single central controller for directly recording the number of the audience who indicate a certain measure of audience approval. The controller also includes at least one radio transmitter for generating radio frequency signals through the audience. Each member of the audience is provided with a response unit including a radio frequency circuit adjusting mechanism shiftable to any of a series of graded approval indicating positions. At each respective approval indicating position each response mechanism is set to tune its radio frequency circuit to a different radio frequency common to all the responsive units. The central transmitter may be provided with a plurality of radio frequency signal output circuits to radiate signals of different frequencies, each output circuit including a recording control circuit responsive to the number of audience response units tuned to the specific frequency of output signal.

With the above system, the signal output circuit may merely be an antenna structure and recording control circuit may merely be a current responsive device for indicating the current supplied to the antenna. Thus when a radio frequency signal is radiated by the antenna, increasing the number of audience response units tuned to this frequency will increase the absorption of radio frequency energy and will also automatically increase the current passing through the antenna circuit. The recording units may merely be conventional recording meters for applying markings to a record sheet such as a chart, corresponding to the number of audience response units set to the respective output signals.

The output signals corresponding to the different responses being measured should be at frequencies differing from each other by an amount assuring the distinctness of the responses and a minimum of possible interference between channels. The antenna and response units should be arranged so that this difference in their location in the auditorium is of negligible effect and the individual responses are substantially identical. The antennas may for example be of the well-known loop form placed over the audience, and secured to the auditorium ceiling for example, extending in a plane generally parallel to that in which the response units are positioned, and large enough to substantially encompass the audience and provide a radio frequency field fairly uniform over all the response units. This form is especially suited for preparing audience approval records in conjunction with the apparatus of the copending Schwerin application Ser. No. 781,454 filed October 22, 1947.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

I claim:

1. In an audience-reaction analyzing system for evaluating the reactions of an audience of a plurality of observers observing the progress of a performance, such as a radio broadcast performance: signal means including an array of a plurality of signal units, one for each observer; each signal unit having signal means selectively operable by an observer to establish a set of different signal conditions corresponding to different reactions of the observer to the performance; recording means including an array of a plurality of recording units for cooperation with the corresponding different signal units; each recording unit having a set of a plurality of punches corresponding to different signal conditions of the corresponding signal unit; record carrier elements operative to advance a succession of sheet elements of record sheet material along corresponding different recording units so that successive sheet elements of said sheet material shall be advanced to successive positions of alignment with the set of punches of the corresponding recording unit; control apparatus including control elements arranged to operate in predetermined synchronized relation to the progress of a performance for performing a succession of control operations synchronized with predetermined successive portions of the performance; each recording unit having punch selector means operative in accordance with the selective operation of the corresponding signal unit so that, depending on the different signal conditions of the corresponding signal unit, a control operation of said control apparatus shall cause a selected punch of the corresponding recording unit to punch a perforation in a selected record position of an aligned sheet element in accordance with the operation of said signal means; and interlinking elements interlinking the operation of said carrier elements with the operation of said recording units for causing each succession of sheet elements to be advanced to a successive punch position before performing another punching operation; and punch operating elements operative in response to a control operation for causing the different recording units to selectively punch perforations in a selected position of each of the record sheet lengths advanced along said recording units in accordance with the selected signal conditions of the corresponding signal units.

2. In an audience-reaction analyzing system for evaluating the reactions of an audience of a plurality of observers observing the progress of a performance, such as a radio broadcast performance: signal means including an array of a plurality of signal units, one for each observer; each signal unit having signal means selectively operable by an observer to establish a set of at least three different signal conditions corresponding to different reactions of the observer to the performance; recording means including an array of a plurality of recording units for cooperation with the corresponding different signal units; each recording unit having a set of at least two punches corresponding to two of said three different signal conditions of the corresponding signal unit; record carrier elements operative to advance a succession of elements of record sheet material along corresponding different recording units so that successive sheet of elements of said sheet material shall be advanced to successive positions of alignment with the set of punches of the corresponding recording unit; synchronized control apparatus including control elements arranged to operate successively in predetermined synchronized relation to the progress of a performance for performing a succession of control operations synchronized with predetermined successive portions of the performance; each recording unit having punch selector means operative in accordance with the selective operation of the corresponding signal unit so that, depending on the different signal conditions of the corresponding signal unit, a control operation of said control apparatus shall cause a selected punch of the corresponding recording unit to punch a perforation in a selected record position of an aligned sheet element in accordance with the operation of said signal means; the operation of said carrier means being interlinked with the operation of said recording units for causing each succession of sheet elements to be advanced to a successive punch position before performing another punching operation; and punch operating elements operative in response to a succession of synchronized control operations for causing the different recording units to selectively punch perforations in a selected position of each of the record sheet lengths advanced along said recording units in accordance with the selected signal conditions of the corresponding signal units.

3. In an audience-reaction analyzing system for evaluating the reactions of an audience of a plurality of observers observing the progress of a performance, such as a radio broadcast performance: signal means including an array of a plurality of signal units, one for each observer; each signal unit having signal means selectively operable by an observer to establish a set of different signal conditions corresponding to different reactions of the observer to the performance; recording means including an array of a plurality of recording units for cooperation with the corresponding different signal units; each recording unit having a set of a plurality of punches corresponding to the different signal conditions of the corresponding signal unit; card carrier elements operative to advance a plurality of cards along corresponding different recording units so that a succession of record columns of each card shall be advanced to successive positions of alignment with the set of punches of the corresponding recording unit; synchronized control apparatus including control elements arranged to operate successively in predetermined synchronized relation to the progress of a performance for performing a succession of control operations synchronized with predetermined successive portions of the performance; each recording unit having punch selector means operative in accordance with the selective operation of the corresponding signal unit so that, depending on the different signal conditions of the corresponding signal unit, a control operation of said control apparatus will cause a selected punch of the corresponding recording unit to punch a perforation in a selected record position of an aligned card column in accordance with the operation of said signal means; and interlinking elements interlinking the operation of said carrier elements with the operation of said recording units for causing each card to be advanced to a successive column position before performing thereon another punching operation; and punch operating elements operative in response to a succession of synchronized control operations for causing the different recording units to selectively punch perforations in a selected position of successive card columns of each of the cards advanced along said recording units in accordance with the selected signal conditions of the corresponding signal unit.

4. In an audience-reaction analyzing system for evaluating the reactions of an audience of a plurality of observers observing the progress of a performance, such as a radio broadcast performance: signal means including an array of a plurality of signal units, one for each observer; each signal unit having signal means selectively operable by an observer to establish a set of at least three different signal conditions corresponding to different reactions of the observer to the performance; recording means including an array of a plurality of recording units for cooperation with the corresponding different signal units; each recording unit having a set of at least two punches corresponding to two of said three different signal conditions of the corresponding signal unit; card carrier elements operative to advance a plurality of cards along corresponding different recording units so that a succession of record columns of each card shall be advanced to successive positions of alignment with the set of punches of the corresponding recording unit; synchronized control apparatus including control elements arranged to operate successively in predetermined synchronized relation to the progress of a performance for performing a succession of control operations synchronized with predetermined successive portions of the performance; each recording unit having punch selector means operative in accordance with the selective operation of the corresponding signal unit so that, depending on the different signal conditions of the corresponding signal unit, a control operation of said control apparatus will cause a selected punch of the corresponding recording unit to punch a perforation in a selected record position of an aligned card column in accordance with the operation of said signal means; and interlinking elements interlinking the operation of said carrier elements with the operation of said recording units for causing each card to be advanced to a successive column position before performing thereon another punching operation; punch operating elements operative in response to a succession of synchronized control operations for causing the different recording units to selectively punch perforations in a selected position of successive card columns of each of the cards advanced along said recording units in accordance with the selected signal conditions of the corresponding signal unit; and performance retaining apparatus operative to retain a performance record arranged to operate in predetermined synchronized relation with the operation of said control apparatus.

5. In an audience-reaction analyzing system for evaluating the reactions of an audience of a plurality of observers observing the progress of a performance, such as a radio broadcast performance: signal means including an array of a plurality of signal units, one for each observer; each signal unit having signal means selectively operable by an observer to establish a set of different signal conditions corresponding to different reactions of the observer to the performance; recording means including an array of a plurality of recording units for cooperation with the corresponding different signal units; each recording unit having a set of a plurality of punches corresponding to the different signal conditions of the corresponding signal unit; card carrier elements operative to advance a plurality of cards along corresponding different recording units so that a succession of record columns of each card shall be advanced to successive positions of alignment with the set of punches of the corresponding recording unit; synchronized control apparatus including control elements arranged to operate successively in predetermined synchronized relation to the progress of a performance for performing a succession of control operations synchronized with predetermined successive portions of the performance; each recording unit having punch selector means operative in accordance with the selective operation of the corresponding signal unit so that, depending on the different signal conditions of the corresponding signal unit, a control operation of said control apparatus will cause a selected punch of the corresponding recording unit to punch a perforation in a selected record position of an aligned card column in accordance with the operation of said signal means; and a common mounting structure carrying an array of a plurality of said recording units and associated card carrier means so as to form therewith a unitary self-supporting recorder structure mountable as a unit remote from the associated signal unit and control apparatus.

6. In an audience-reaction analyzing system for evaluating the reactions of an audience of a plurality of observers observing the progress of a performance, such as a radio broadcasting performance: signal means including an array of a plurality of signal units, one for each observer; each signal unit having signal means selectively operable by an observer to establish a set of different signal conditions corresponding to different reactions of the observer to the performance; recording means including an array of plurality of recording units for cooperation with the corresponding different signal units; each recording unit having a set of a plurality of punches corresponding to different signal conditions of the corresponding signal unit; record carrier elements operative to advance a succession of sheet elements of record sheet material along corresponding different recording units so that successive sheet elements of said sheet material shall be advanced to successive positions of alignment with the set of punches of the corresponding recording unit; control apparatus including control elements arranged to operate in predetermined synchronized relation to the progress of a performance for performing a succession of control operations synchronized with predetermined successive portions of the performance; each recording unit having punch selector means operative in accordance with the selective operation of the corresponding signal unit so that, depending on the different signal conditions of the corresponding signal unit, a control operation of said control apparatus shall cause a selected punch of the corresponding recording unit to punch a perforation in a selected record position of an aligned sheet element in accordance with the operation of said signal means; and interlinking elements interlinking the operation of said carrier elements with the operation of said recording units for causing each succession of sheet elements to be advanced to a successive punch position before performing another punching operation; and punch operating elements operative in response to a control operation for causing the different recording units to selectively punch perforations in a selected position of each of the record sheet elements advanced along said recording units in accordance with the selected signal condition of the corresponding signal unit; and in combination therewith of the punch selector means of each recording unit having a member movable to different selected positions correlated to the different punches of its recording unit for causing a selected punch to perform a punching operation upon actuation of the recording unit to carry out a punching operation.

7. In an audience-reaction analyzing system for evaluating the reactions of an audience of a plurality of observers observing the progress of a performance, such as a radio broadcasting performance: signal means including an array of a plurality of signal units, one for each observer; each signal unit having signal means selectively operable by an observer to establish a set of different signal conditions corresponding to different reactions of the observer to the performance; recording means including an array of plurality of recording units for cooperation with the corresponding different signal units; each recording unit having a set of a plurality of punches corresponding to different signal conditions of the corresponding signal unit; record carrier elements operative to advance a succession of sheet elements of record sheet material along corresponding different recording units so that successive sheet elements of said sheet material shall be advanced to successive positions of alignment with the set of punches of the corresponding recording unit; control apparatus including control elements arranged to operate in predetermined synchronized relation to the progress of a performance for performing a succession of control operations synchronized with predetermined successive portions of the performance; each recording unit having punch selector means operative in accordance with the selective operation of the corresponding signal unit so that, depending on the different signal conditions of the corresponding signal unit, a control operation of said control apparatus shall cause a selected punch of the corresponding recording unit to punch a perforation in a selected record position of an aligned sheet element in accordance with the operation of said signal means; and interlinking elements interlinking the operation of said carrier elements with the operation of said recording units for causing each succession of sheet elements to be advanced to a successive punch position before performing another punching operation; and punch operating elements operative in response to a control operation for causing the different recording units to selectively punch perforations in a selected position of each of the record sheet elements advanced along said recording units in accordance with the selected signal condition of the corresponding signal unit; and in combination therewith of supplemental control means selectively actuable to perform a control operation causing the different recording units to selectively punch perforations in a selected record position of an aligned sheet element in accordance with the different signal conditions of the corresponding signal units without disturbing the operation of the synchronized control means in controlling the operation of the recording means.

8. In an audience-reaction analyzing system for evaluating the reactions of an audience of a plurality of observers observing the progress of a performance, such as a radio broadcasting performance: signal means including an array of a plurality of signal units, one for each observer; each signal unit having signal means selectively operable by an observer to establish a set of different signal conditions corresponding to different reactions of the observer to the performance; recording means including an array of plurality of recording units for cooperation with the corresponding different signal units; each recording unit having a set of a plurality of punches corresponding to different signal conditions of the corresponding signal unit; record carrier elements operative to advance a succession of sheet elements of record sheet material along corresponding different recording units so that successive sheet elements of said sheet material shall be advanced to successive positions of alignment with the set of punches of the corresponding recording unit; control apparatus including control elements arranged to operate in predetermined synchronized relation to the progress of a performance for performing a succession of control operations synchronized with predetermined successive portions of the performance; each recording unit having punch selector means operative in accordance with the selective operation of the corresponding signal unit so that, depending on the different signal conditions of the corresponding signal unit, a control operation of said control apparatus shall cause a selected punch of the corresponding recording unit to punch a perforation in a selected record position of an aligned sheet element in accordance with the operation of said signal means; and interlinking elements interlinking the operation of said carrier elements with the operation of said recording units for causing each succession of sheet elements to be advanced to a successive punch position before performing another punching operation; and punch operating elements operative in response to a control operation for causing the different recording units to selectively punch perforations in a selected position of each of the record sheet elements advanced along said recording units in accordance with the selected signal condition of the corresponding signal unit; and in combination therewith of interlocking means operative in response to the initiation of a control operation to cause said recording units to selectively punch a perforation in accordance with the signal condition of the corresponding signal unit at a predetermined moment of the initiated control operation irrespective of subsequent changes of the signal conditions.

9. A system as defined by claim 3 in combination with preventive means operative whenever a control operation is performed to prevent changes in the signal conditions of the signal units from changing the selective operation of the recording units in accordance with different signal conditions of the corresponding signal units at a predetermined moment of the control operation.

10. A system as defined by claim 9 in which the punch selector means of each recording unit have a member movable to different selected positions correlated to the different punches of its recording unit for causing a selected punch to perform a punching operation upon actuation of the recording unit to carry out a punching operation.

11. In an audience-reaction analyzing system for evaluating the reactions of an audience of a plurality of observers observing the progress of a performance, such as a radio broadcasting performance: signal means including an array of a plurality of signal units, one for each observer; each signal unit having signal means selectively operable by an observer to establish a set of different signal conditions corresponding to different reactions of the observer to the performance; recording means including an array of plurality of recording units for cooperation with the corresponding different signal units; each recording unit having a set of a plurality of punches corresponding to different signal conditions of the corresponding signal unit; record carrier elements operative to advance a succession of sheet elements of record sheet material along corresponding different recording units so that successive sheet elements of said sheet material shall be advanced to successive positions of alignment with the set of punches of the corresponding recording unit; control apparatus including control elements arranged to operate in predetermined synchronized relation to the progress of a performance for performing a succession of control operations synchronized with predetermined successive portions of the performance; each recording unit having punch selector means operative in accordance with the selective operation of the corresponding signal unit so that, depending on the different signal conditions of the corresponding signal unit, a control operation of said control apparatus shall cause a selected punch of the corresponding recording unit to punch a perforation in a selected record position of an aligned sheet element in accordance with the operation of said signal means; and interlinking elements interlinking the operation of said carrier elements with the operation of said recording units for causing each succession of sheet elements to be advanced to a successive punch position before performing another punching operation; and punch operating elements operative in response to a control operation for causing the different recording units to selectively punch perforations in a selected position of each of the record sheet elements advanced along said recording units in accordance with the selected signal condition of the corresponding signal unit; and in combination therewith of the punch selector means of each recording unit having a member movable to different selected positions correlated to the different punches of its recording unit for causing a selected punch to perform a punching operation upon actuation of the recording unit to carry out a punching operation.

12. A system as defined by claim 11 in combination with interlocking means operative in response to the initiation of a control operation to cause said recording units to selectively punch a perforation in accordance with the signal condition of the corresponding signal unit at a predetermined moment of the initiated control operation irrespective of subsequent changes of the signal conditions.

13. A system as defined by claim 12 in which the punch selector means of each recording unit have a member movable to different selected positions correlated to the different punches of its recording unit for causing a selected punch to perform a punching operation upon actuation of the recording unit to carry out a punching operation.

14. In an audience-reaction analyzing system for evaluating the reactions of an audience of a plurality of observers observing the progress of a performance, such as a radio broadcasting performance: signal means including an array of a plurality of signal units, one for each observer; each signal unit having signal means selectively operable by an observer to establish a set of different signal conditions corresponding to different reactions of the observer to the performance; recording means including an array of plurality of recording units for cooperation with the corresponding different signal units; each recording unit having a set of a plurality of punches corresponding to different signal conditions of the corresponding signal unit; record carrier elements operative to advance a succession of sheet elements of record sheet material along corresponding different recording units so that successive sheet elements of said sheet material shall be advanced to successive positions of alignment with the set of punches of the corresponding recording unit; control apparatus including control elements arranged to operate in predetermined synchronized relation to the progress of a performance for performing a succession of control operations synchronized with predetermined successive portions of the performance; each recording unit having punch selector means operative in accordance with the selective operation of the corresponding signal unit so that, depending on the different signal conditions of the corresponding signal unit, a control operation of said control apparatus shall cause a selected punch of the corresponding recording unit to punch a perforation in a selected record position of an aligned sheet element in accordance with the operation of said signal means; and interlinking elements interlinking the operation of said carrier elements with the operation of said recording units for causing each succession of sheet elements to be advanced to a successive punch position before performing another punching operation; and punch operating elements operative in response to a control operation for causing the different recording units to selectively punch perforations in a selected position of each of the record sheet elements advanced along said recording units in accordance with the selected signal condition of the corresponding signal unit; and in combination therewith of a recording unit adjacent each observer; each recording unit being connected to the corresponding signal unit for operation by the observer; and a pair of power supply connectors having branches connected to each recording unit and to said control means for providing energizing current from a control power supply through the control means to each recording unit with a small amount of wiring.

PAUL SCHWERIN.

No references cited.